US 9,656,517 B2

(12) United States Patent
Mochinaga et al.

(10) Patent No.: US 9,656,517 B2
(45) Date of Patent: May 23, 2017

(54) WHEEL BEARING AND BEARING DEVICE

(75) Inventors: Shuji Mochinaga, Iwata (JP); Takayuki Norimatsu, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/345,483

(22) PCT Filed: Sep. 12, 2012

(86) PCT No.: PCT/JP2012/073342
§ 371 (c)(1),
(2), (4) Date: Mar. 18, 2014

(87) PCT Pub. No.: WO2013/042595
PCT Pub. Date: Mar. 28, 2013

(65) Prior Publication Data
US 2014/0361606 A1  Dec. 11, 2014

(30) Foreign Application Priority Data

Sep. 21, 2011 (JP) ................... 2011-206576
Sep. 21, 2011 (JP) ................... 2011-206578
Sep. 6, 2012 (JP) ................... 2012-196325

(51) Int. Cl.
*B60B 27/00* (2006.01)
*F16C 35/063* (2006.01)
(Continued)

(52) U.S. Cl.
CPC ...... *B60B 27/0042* (2013.01); *B60B 27/0005* (2013.01); *B60B 27/0026* (2013.01);
(Continued)

(58) Field of Classification Search
CPC ............ B60B 27/0005; B60B 27/0026; B60B 27/0042; B60B 27/0084; B60B 27/00
(Continued)

(56) References Cited

U.S. PATENT DOCUMENTS 4,229,952 A * 10/1980 Aucktor et al. ............... 464/145
4,359,128 A * 11/1982 Krude .......................... 180/258
(Continued)

FOREIGN PATENT DOCUMENTS

CN  101980877  2/2011
JP  2009-97557  5/2009
(Continued)

OTHER PUBLICATIONS

Office Action issued Sep. 14, 2015, in corresponding Chinese Application No. 201280046239.1 with English translation.
(Continued)

Primary Examiner — Hau Phan
(74) Attorney, Agent, or Firm — Wenderoth, Lind & Ponack, L.L.P.

(57) ABSTRACT

A wheel bearing includes a constant velocity universal joint and a wheel bearing. The wheel bearing is separably coupled to the constant velocity universal joint with a screw fastening structure, in which a stem section of an outer joint member of the constant velocity universal joint is fitted to an inner diameter portion of the hub wheel. Projecting portions extending in an axial direction are formed on the stem section of the outer joint member, and depressed portions having an interference with respect to the projecting portions are formed on the hub wheel. The stem section of the outer joint member is press-fitted to the hub wheel, and a shape of the projecting portions is transferred to the other, to thereby provide a projection and depression fitting structure in which the projecting portions and the depressed portions are in close contact at an entire fitting contact portion therebetween.

16 Claims, 28 Drawing Sheets

(51) Int. Cl.
*F16D 1/072* (2006.01)
*F16D 3/223* (2011.01)
*F16C 19/18* (2006.01)
*F16D 1/08* (2006.01)
*F16D 1/076* (2006.01)

(52) U.S. Cl.
CPC .......... *F16C 19/185* (2013.01); *F16C 19/186* (2013.01); *F16C 35/0635* (2013.01); *F16D 1/072* (2013.01); *F16D 1/076* (2013.01); *F16D 1/0858* (2013.01); *F16D 3/223* (2013.01); *B60B 2900/541* (2013.01); *F16C 2326/02* (2013.01); *F16D 2003/22326* (2013.01)

(58) Field of Classification Search
USPC ...... 301/109, 105.1; 384/544, 542, 537, 589
See application file for complete search history.

(56) References Cited

U.S. PATENT DOCUMENTS

| | | | |
|---|---|---|---|
| 5,788,578 A * | 8/1998 | Shimizu et al. | 464/145 |
| 6,224,490 B1 * | 5/2001 | Iihara et al. | 464/145 |
| 6,390,924 B1 * | 5/2002 | Yoshida et al. | 464/111 |
| 7,811,176 B2 * | 10/2010 | Cermak | 464/178 |
| 8,132,968 B2 * | 3/2012 | Fukumura et al. | 384/544 |
| 8,708,570 B2 * | 4/2014 | Umekida et al. | 384/544 |
| 2001/0016520 A1 * | 8/2001 | Sahashi et al. | 464/182 |
| 2009/0180726 A1 * | 7/2009 | Siebeneick et al. | 384/512 |
| 2010/0119186 A1 | 5/2010 | Fukumura et al. | |
| 2010/0220946 A1 * | 9/2010 | Ozawa et al. | 384/456 |
| 2011/0002567 A1 | 1/2011 | Ishijima et al. | |
| 2011/0009199 A1 * | 1/2011 | Yamauchi et al. | 464/106 |
| 2011/0012420 A1 * | 1/2011 | Nakagawa et al. | 301/110 |
| 2012/0281941 A1 | 11/2012 | Umekida et al. | |

FOREIGN PATENT DOCUMENTS

| | | |
|---|---|---|
| JP | 2009-154591 | 7/2009 |
| JP | 2010-47058 | 3/2010 |
| JP | 2010-144902 | 7/2010 |
| WO | 2008/001554 | 1/2008 |
| WO | 2011/077903 | 6/2011 |

OTHER PUBLICATIONS

Office Action issued Jul. 4, 2016 in corresponding Japanese Application No. 2012-196325, with English translation.
International Preliminary Report on Patentability and Written Opinion of the International Searching Authority issued Apr. 3, 2014 in International (PCT) Application No. PCT/JP2012/073342.
International Search Report issued Dec. 25, 2012 in International (PCT) Application No. PCT/JP2012/073342.

* cited by examiner

WHEEL BEARING AND BEARING DEVICE

TECHNICAL FIELD

The present invention relates to a wheel bearing and a bearing device which rotatably support a driving wheel (front wheel of a front-engine front-drive (FF) vehicle, rear wheel of a front-engine rear-drive (FR) vehicle, and all wheels of a four-wheel drive (4WD) vehicle) with respect to a suspension device for an automobile, for example.

BACKGROUND ART

As a related-art wheel bearing device, for example, there is proposed a wheel bearing device configured so that a hub wheel is separable from an outer joint member of a constant velocity universal joint to attain excellent maintainability (see, far example, Patent Literature 1). As illustrated in FIG. 26, the wheel bearing device disclosed in Patent Literature 1 includes, as main components thereof, a fixed type constant velocity universal joint 106, and a wheel bearing 120 including a hub wheel 101, an inner race 102, double-row rolling elements 103 and 104, and an outer race 105.

The hub wheel 101 has an inner raceway surface 107 on an outboard side formed on an outer peripheral surface thereof, and includes a wheel mounting flange 109 for allowing a wheel (not shown) to be mounted thereto. Hub bolts 110 for fixing a wheel disc are equiangularly embedded in the wheel mounting flange 109. The inner race 102 is fitted to a small-diameter step portion 112 formed on an outer peripheral surface of the hub wheel 101 on the inboard side, and an inner raceway surface 108 on the inboard side is formed on an outer peripheral surface of the inner race 102.

The inner race 102 is press-fitted with adequate interference for the purpose of preventing creep. The inner raceway surface 107 on the outboard side that is formed on the outer peripheral surface of the hub wheel 101 and the inner raceway surface 108 on the inboard side that is forced on the outer peripheral surface of the inner race 102 constitute double-row inner raceway surfaces. The inner race 102 is press-fitted to the small-diameter step portion 112 of the hub wheel 101, and the end portion of the small-diameter step portion 112 is crimped outward. As a result, the inner race 102 is retained by a crimped portion 111 thus formed and integrated with the hub wheel 101, to thereby apply preload to the wheel bearing 120.

The outer race 105 has double-row outer raceway surfaces 113 and 114 formed on an inner peripheral surface thereof and opposed to the inner raceway surfaces 107 and 108 of the hub wheel 101 and the inner race 102. An outer peripheral surface of the outer race 105 is fitted and fixed to a knuckle extending from a suspension device (not shown) of a vehicle body, and thus the wheel bearing device is mounted to the vehicle body.

The wheel bearing 120 has a double-row angular ball bearing structure. Specifically, the rolling elements 103 and 104 are interposed between the inner raceway surfaces 107 and 108 termed on the outer peripheral surfaces of the hub wheel 101 and the inner race 102 and the outer raceway surfaces 113 and 114 formed on the inner peripheral surface of the outer race 105, and the rolling elements 103 and 104 in respective rows are equiangularly supported by cages 115 and 116.

At opening portions on both ends of the wheel bearing 120, a pair of seals 117 and 118 for sealing annular spaces between the outer race 105 and the hub wheel 101 and between the outer race 105 and the inner race 102 so as to be held in sliding-contact with the outer peripheral surfaces of the hub wheel 101 and the inner race 102 are fitted to the inner diameter portions at both end portions of the outer race 105. Further, the seals 117 and 118 prevent leakage of grease filled inside and intrusion of water and foreign matter from the outside.

The constant velocity universal joint 106 includes an outer joint member 124 provided at one end of an intermediate shaft 122 that constitutes a drive shaft 121, the outer joint member 124 having track grooves 123 formed in an inner peripheral surface thereof, an inner joint member 126 having track grooves 125 formed in an outer peripheral surface thereof so as to be opposed to the track grooves 123 of the outer joint member 124, balls 127 built into spaces between the track grooves 123 of the outer joint member 124 and the track grooves 125 of the inner joint member 126, and a cage 128 interposed between the inner peripheral surface of the outer joint member 124 and the outer peripheral surface of the inner joint member 126 to retain the balls 127.

The outer joint member 124 includes a mouth section 129 that accommodates internal components such as the inner joint member 126, the balls 227, and the cage 128, and a stem section 130 that integrally extends from the mouth section 129 in an axial direction. An axial end of the intermediate shaft 122 is press-fitted to the inner joint member 126, and is coupled by spline fitting to allow torque transmission therebetween.

A bellows-like boot 131 made of a resin is mounted between the outer joint member 124 of the constant velocity universal joint 106 and the intermediate shaft 122 to prevent leakage of a lubricant such as grease filled inside the joint, and to prevent intrusion of foreign matter from outside the joint, thereby attaining a structure of closing an opening portion of the outer joint member 124 with the boot 131.

The boot 131 includes a large-diameter end portion 133 fastened and fixed with a boot band 132 on an outer peripheral surface of the outer joint member 124, a small-diameter end portion 135 fastened and fixed with a boot band 134 on an outer peripheral surface of the intermediate shaft 122, and a flexible bellows portion 136 connecting the large-diameter end portion 133 and the small-diameter end portion 135, and reduced in diameter in a range of from the large-diameter end portion 133 toward the small-diameter end portion 135.

FIG. 27 illustrates a state before press-fitting the stem section 130 of the outer joint member 124 to a shaft hole 138 of the hub wheel 101. As illustrated in FIG. 27, a male spline including a plurality of projecting portions 137 extending in the axial direction is formed on an outer peripheral surface of the stem section 130 of the outer joint member 124. On the other hand, a simple cylindrical portion 139 having no female spline formed thereon is provided to an inner peripheral surface of the shaft hole 138 of the hub wheel 101.

FIG. 28 illustrates a state after press-fitting the stem section 130 of the outer joint member 124 to the shaft hole 138 of the hub wheel 101. The stem section 130 of the outer joint member 124 is press-fitted to the shaft hole 138 of the hub wheel 101, and the shape of the projecting portions 137 of the stem section 130 is transferred to the inner peripheral surface of the shaft hole 138 of the hub wheel 101. Thus, as illustrated in FIG. 28, depressed portions 140 brought into close contact with the projecting portions 137 with an interference therebetween axe formed on the inner peripheral surface of the shaft hole 138 of the hub wheel 101. In this manner, there is attained a projection and depression fitting structure in which the projecting portions 137 and the depressed portions 140 are brought into close contact with each other at an entire fitting contact portion therebetween, with the result that the outer joint member 124 and the hub wheel 101 are coupled to each other to allow torque transmission therebetween.

As described above, under the state in which the stem section 130 of the outer joint member 124 is press-fitted to the shaft hole 138 of the hub wheel 101, as illustrated in FIG. 26, a bolt 142 is threadedly engaged with a female thread 141 formed at an axial end of the stem section 130 of the outer joint member 124, and is therefore fastened, in a state of being locked at an end surface of the hub wheel 101, to thereby fix the constant velocity universal joint 106 to the hub wheel 101.

CITATION LIST

Patent Literature 1: JP 2009-97557 A

SUMMARY OF INVENTION

Technical Problems

By the way, in the above-mentioned wheel bearing device, the fixed type constant velocity universal joint 106 to be coupled to the wheel bearing 120 including the hub wheel 101, the inner race 102, the double-row rolling elements 103 and 104, and the outer race 105 constitutes a part of the drive shaft 121. It is necessary that the drive shaft 121 for transmitting power from an engine to a wheel of an automobile be adaptable to angular displacement and axial displacement caused by a change in relative positional relationship between the engine and the wheel, and hence, as in the structure illustrated in FIG. 29, a plunging type constant velocity universal joint 151 and the fixed type constant velocity universal joint 106 are generally installed on the engine side (inboard side) and the wheel side (outboard side), respectively, and both the constant velocity universal joints 106 and 151 are coupled to each other through the intermediate shaft 122.

In this case, in the related-art wheel bearing device, as illustrated in FIG. 27, the simple cylindrical portion 139 having no female spline formed thereon is provided to the inner peripheral surface of the shaft hole 138 of the hub wheel 101. Therefore, when press-fitting the stem section 130 of the outer joint member 124 to the shaft hole 138 of the hub wheel 101, a significant press-fitting load is necessary to transfer the shape of the projecting portions 137 of the stem section 130 to the inner peripheral surface of the shaft hole 138, and hence it is necessary to use a press machine or the like. For this reason, in the current circumstances, the wheel bearing device needs to be assembled to the vehicle body under a state in which the constant velocity universal joint 106 of the drive shaft 121 is assembled to the wheel bearing 120.

As a result, at the time of assembling the vehicle in an automobile manufacturer, the wheel bearing device is handled under a state in which the wheel bearing 120 and the constant velocity universal joint 106 of the drive shaft 121 are coupled to each other, that is, under a state in which the wheel bearing 120 and the two constant velocity universal joints 106 and 151 of the drive shaft 121 are integrated with each other. The minimum inner diameter dimension of a knuckle 152 (see FIG. 29) extending from the suspension device of the vehicle body is set larger than the maximum outer diameter dimension of the constant velocity universal joints 106 and 151, and hence the wheel bearing device is assembled to the vehicle body by, as illustrated in FIG. 30, sequentially inserting the plunging type constant velocity universal joint 151 and the fixed type constant velocity universal joint 106 of the drive shaft 121 through the knuckle 152 extending from the suspension device of the vehicle body, and then fitting and fixing the outer race 105 of the wheel bearing 120 to the knuckle 152.

The drive shaft 121 is an elongated assembly unit connecting the wheel side and the engine side, and hence the workability is poor in the above-mentioned method of assembling the wheel bearing device to the vehicle body by sequentially inserting the plunging type constant velocity universal joint 151 and the fixed type constant velocity universal joint 106 of the drive shaft 121 through the knuckle 152. As a result, the components of the drive shaft 121 may be damaged at the time of assembling the wheel bearing device.

Therefore, the present invention has been proposed in view of the above-mentioned problems, and it is an object thereof to provide a wheel bearing and a bearing device capable of enhancing workability when assembling the bearing device to a vehicle body and forestalling damage to components at the time of assembling the bearing device.

Solution to Problems

As a technical measure to achieve the above-mentioned object, the present invention provides a wheel bearing device, comprising a constant velocity universal joint and a wheel bearing comprising: an outer member having double-row outer raceway surfaces formed on an inner periphery thereof; an inner member comprising a hub wheel and an inner race, the inner member having double-row inner raceway surfaces formed on an outer periphery thereof so as to be opposed to the double-row outer raceway surfaces; and double-row rolling elements interposed between the double-row outer raceway surfaces of the outer member and the double-row inner raceway surfaces of the inner member, the wheel bearing having the constant velocity universal joint separably coupled thereto with a screw fastening structure, in which a stem section of an outer joint member of the constant velocity universal joint is fitted to an inner diameter portion of the hub wheel, wherein a plurality of projecting portions extending in an axial direction are formed on one of the hub wheel and the stem section of the outer joint member, and a plurality of depressed portions having an interference with respect to the plurality of projecting portions are formed on another of the hub wheel and the stem section of the outer joint member, and the stem section of the outer joint member is press-fitted to the hub wheel, and a shape of the plurality of projecting portions is transferred to the another of the hub wheel and the stem section of the outer joint member, to thereby provide a projection and depression fitting structure in which the plurality of projecting portions and the plurality of depressed portions are brought into close contact with each other at an entire fitting contact portion therebetween.

In the present invention, the plurality of projecting portions extending in the axial direction are formed on one of the hub wheel and the stem section of the outer joint member, and the depressed portions having the interference with respect to the projecting portions are formed in advance on another of the hub wheel and the stem section of the outer joint member. One of the hub wheel and the stem section of the outer joint member is press-fitted to the other, to thereby provide the projection and depression fitting structure in which the projecting portions and the depressed portions are brought into close contact with each other at the entire fitting contact portion therebetween.

In this case, the shape of the projecting portions is transferred to the depressed portion forming surface on the mating side while involving plastic deformation and cutting work with the projecting portions. At this time, the projecting portions dig into the depressed portion forming surface on the mating side so that the inner diameter portion of the hub wheel is slightly increased. Thus, relative movement of the projecting portions in the axial direction is allowed in this state. When the relative movement of the projecting portions in the axial direction is stopped, the inner diameter portion of the hub wheel is reduced to recover the original diameter. Thus, the projecting portions and the depressed portions are brought into close contact with each other at the entire fitting contact portion therebetween, with the result that the outer joint member and the hub wheel can firmly be coupled to and integrated with each other.

In this case, the depressed portions having the interference with respect to the projecting portions are formed in advance, and hence the press-fitting load to be applied when the projecting portions and the depressed portions are brought into close contact with each other at the entire fitting contact portion therebetween can further be reduced as compared to the related art in which the shape of the projecting portions is transferred to the simple cylindrical portion. Thus, after the wheel bearing is mounted to the vehicle body, the outer joint member is press-fitted to the hub wheel of the wheel bearing so that the constant velocity universal joint is easily coupled to the wheel bearing.

In the present invention, it is desired that the outer joint member be configured to be press-fitted to the hub wheel due to a force that is equal to or smaller than an axial force generated by the screw fastening structure. With this structure, there is no need to separately prepare a dedicated jig when press-fitting the outer joint member to the hub wheel of the wheel bearing after the wheel bearing is mounted to the vehicle body. Instead, the constant velocity universal joint can easily be coupled to the wheel bearing with the screw fastening structure that is a component of the wheel bearing device.

The screw fastening structure of the present invention may be a structure comprising: a female thread portion formed at an axial end of the stem section of the outer joint member; and a male thread portion to be locked at the hub wheel in a state of being threadedly engaged with the female thread portion. In this structure, the male thread portion is threadedly engaged with the female thread portion of the stem section, and is therefore fastened in a state of being locked at the hub wheel, to thereby fix the constant velocity universal joint to the hub wheel.

The screw fastening structure of the present invention may be a structure comprising: a male thread portion formed at an axial end of the stem section of the outer joint member; and a female thread portion to be locked at the hub wheel in a state of being threadedly engaged with the male thread portion. In this structure, the female thread portion is threadedly engaged with the male thread portion of the stem section, and is therefore fastened in a state of being locked at the hub wheel, to thereby fix the constant velocity universal joint to the hub wheel.

In the present invention, it is desired that the plurality of projecting portions be provided on the stem section of the outer joint member, and the plurality of depressed portions be provided on the hub wheel. With this structure, the projection and depression fitting structure in which the projecting portions and the depressed portions are brought into close contact with each other at the entire fitting contact portion therebetween can easily be provided through press fitting of the stem section of the outer joint member to the hub wheel.

In the present invention, it is desired that the plurality or depressed portions having the interference with respect to the plurality of projecting portions be set smaller than the plurality of projecting portions. With this structure, one of the hub wheel and the stem section of the outer joint member can easily be press-fitted to the other, and hence the projection and depression fitting structure in which the projecting portions and the depressed portions are brought into close contact with each other at the entire fitting contact portion therebetween can reliably be provided.

In the present invention, it is desired that a surface hardness of the plurality of projecting portions be set larger than a surface hardness of the plurality of depressed portions. With this structure, when press-fitting one of the hub wheel and the stem section of the outer joint member to the other, through the plastic deformation and the cutting work, the shape of the projecting portions can easily be transferred to the depressed portion forming surface on the mating side.

In the present invention, it is desired that the projection and depression fitting structure be a structure comprising an accommodating portion for accommodating a flash portion generated due to transfer of the shape of the plurality of projecting portions through press fitting. With this structure, the flash portion generated due to the transfer of the shape of the projecting portions through press fitting can foe kept in the accommodating portion, thereby being capable of inhibiting the flash portion from entering, for example, the inside of the vehicle that is positioned outside the device.

In the present invention, it is desired that the projection and depression fitting structure foe a structure further comprising a guide portion for guiding a start of the press fitting. With this structure, when press-fitting one of the hub wheel and the stem section of the outer joint member to the other, stable press fitting can be carried out to prevent axial misalignment, axial inclination, and the like at the time of press fitting.

In the present invention, it is desired that, among the double-row rolling elements, a PCD of a rolling elements positioned on an inboard, side be set larger than a PCD of a rolling elements positioned on an outboard side. With this structure, the thickness of the inner race having the inner raceway surface on the inboard side formed thereon can be increased, and thus the hoop stress that may be generated due to the press fitting of the projecting portions can be suppressed. As a result, through the arrangement of the projection and depression fitting structure on the inboard side with respect to the bearing center, the axial dimension of the stem section of the outer joint member can be reduced, and the outer joint member can be light-weighted. Thus, the reduction in rolling fatigue life and the crack formation of the wheel bearing that may foe caused by the generation of the hoop stress can be prevented, and the light-weighting can be achieved through the reduction in length of the stem section of the outer joint member.

In the present invention, it is desired that the hub wheel have a cutout hole for confirming a press-fitting position of the plurality of projecting portions. With this structure, the press-fitting position of the projecting portions can be confirmed by utilizing the cutout hole provided in the hub wheel. As a result, a stable press-fitting state of the projecting portions can easily be secured. This confirmation is effective in a case where the projection and depression fitting structure is arranged on the inboard side with respect to the bearing center to reduce the axial dimension of the stem section of the outer joint member.

Further, the present invention provides a wheel bearing, comprising: an outer member having double-row outer raceway surfaces formed on an inner periphery thereof; an inner member comprising a hub wheel and an inner race, the inner member having double-row inner raceway surfaces formed on an outer periphery thereof so as to be opposed to the double-row outer raceway surfaces; and double-row rolling elements interposed between the double-row outer raceway surfaces of the outer member and the double-row inner raceway surfaces of the inner member, wherein the hub wheel comprises: a depressed portion provided on an outboard side of an inner peripheral surface of the hub wheel; and a guide portion provided on an inboard side of the depressed portion, and wherein the guide portion comprises a depressed portion that is larger than the depressed portion provided on the outboard side.

In the present invention, when press-fitting the stem section of the outer joint member to the hub wheel, the guide portion can guide the projecting portion of the stem section so that the projecting portion is reliably press-fitted to the depressed portion of the hub wheel. Thus, stable press fitting can be carried out to prevent axial misalignment, axial inclination, and the like at the time of press fitting.

In the present invention, it is desired that the wheel bearing further comprise a cylindrical fitting surface formed on the inboard side of the guide portion. With this structure, prior to press-fitting the stem section of the outer joint member to the hub wheel, the axial alignment of the stem section with the hub wheel can easily be carried out by fitting the stem section to the fitting surface of the hub wheel.

In the present invention, it is desired that, among the double-row rolling elements, a PCD of a rolling elements positioned on the inboard side be set larger than a PCD of a rolling elements positioned on the outboard side. With this structure, the thickness of the inner race having the inner raceway surface on the inboard side formed thereon can be increased, and thus the hoop stress that may be generated due to the press fitting of the projecting portion can be suppressed.

In the present invention, it is desired that the depressed portion be arranged on an inner periphery of the hub wheel that is positioned at a groove bottom of an inner raceway surface of a rolling elements positioned on the inboard side. With this structure, the axial dimension of the stem section of the outer joint member can be reduced, and the outer joint member can be light-weighted.

Advantageous Effects of Invention

According to one embodiment of the present invention, the plurality of projecting portions extending in the axial direction are formed on one of the hub wheel and the stem section of the outer joint member, and the plurality of depressed portions having the interference with respect to the plurality of projecting portions are formed on another of the hub wheel and the stem section of the outer joint member, and the stem section of the outer joint member is press-fitted to the hub wheel, and the shape of the projecting portions is transferred to the another of the hub wheel and the stem section of the outer joint member, to thereby provide the projection and depression fitting structure in which the projecting portions and the depressed portions are brought into close contact with each other at the entire fitting contact portion therebetween. Therefore, the depressed portions having the interference with respect to the projecting portions are formed in advance, and hence the press-fitting load to be applied when the projecting portions and the depressed portions are brought into close contact with each other at the entire fitting contact portion therebetween can be reduced. Accordingly, after the wheel bearing is mounted to the vehicle body, the outer joint member is press-fitted to the hub wheel of the wheel bearing so that the constant velocity universal joint is easily coupled to the wheel bearing. Thus, the workability can be enhanced, when assembling the wheel bearing device to the vehicle body, and the damage to the components can be forestalled at the time of assembling the wheel bearing device.

DESCRIPTION OF EMBODIMENTS

Figure 1:
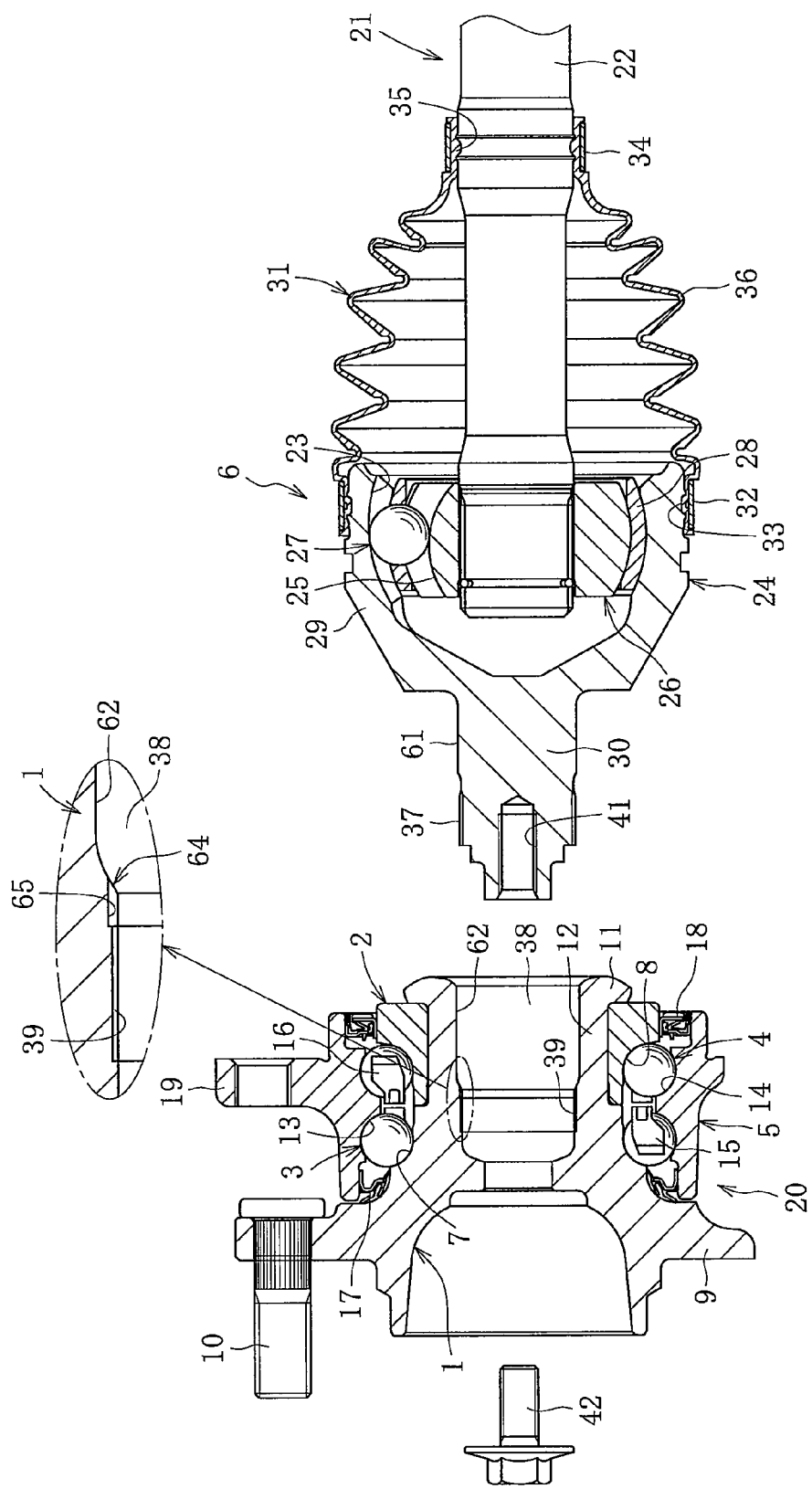
FIG. 1 is a vertical sectional view illustrating a state before assembling a constant velocity universal joint to a wheel bearing having a crimping structure in a wheel bearing device (third generation) according to an embodiment of the present invention.
Figure 2:
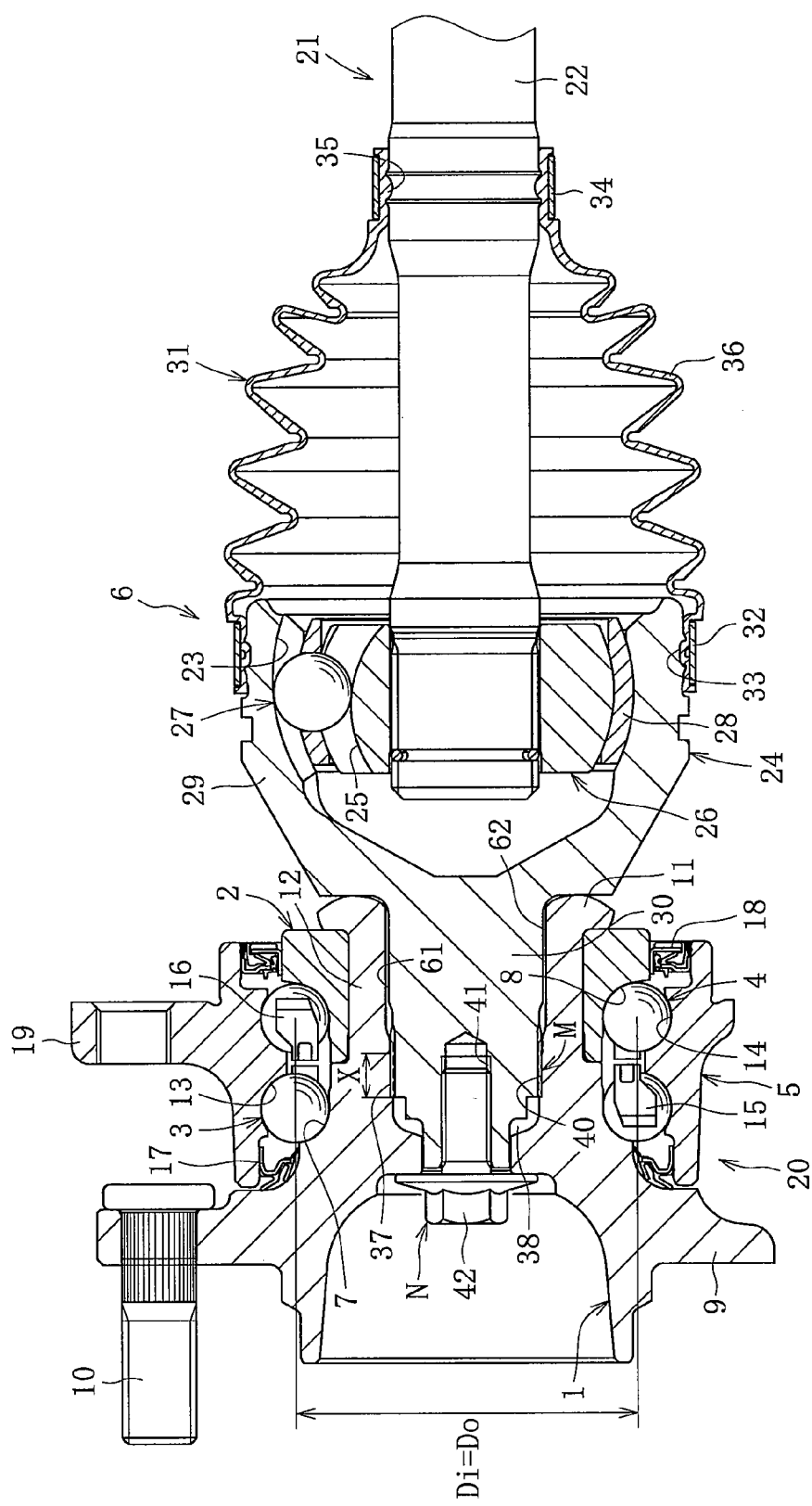
FIG. 2 is a vertical sectional view illustrating a state after assembling the constant velocity universal joint to the wheel bearing of FIG. 1.

Now, a wheel bearing device according to embodiments of the present invention is described in detail. A wheel bearing device illustrated in FIGS. 1 and 2 comprises, as main components thereof, a constant velocity universal joint 6, and a wheel bearing 20 comprising a hub wheel 1 and an inner race 2 that serve as an inner member, double-row rolling elements 3 and 4, and an outer race 5. FIG. 1 illustrates a state before assembling the constant velocity universal joint 6 to the wheel bearing 20, and FIG. 2 illustrates a state after assembling the constant velocity universal joint 6 to the wheel bearing 20. Note that, in the following description, an outer side of a vehicle in a state in which the wheel bearing device is assembled to the vehicle is referred to as an outboard side (left side in the figures), and a middle side of the vehicle is referred to as an inboard side (right side in the figures).

The hub wheel 1 has an inner raceway surface 7 on the outboard side formed on an outer peripheral surface thereof, and comprises a wheel mounting flange 9 for allowing a wheel (not shown) to be mounted thereto. Hub bolts 10 for fixing a wheel disc are equiangularly embedded in the wheel mounting flange 9. The inner race 2 is fitted to a small diameter step portion 12 formed on an outer peripheral surface of the hub wheel 1 on the inboard side, and an inner raceway surface 8 on the inboard side is formed on an outer peripheral surface of the inner race 2.

The inner race 2 is press-fitted with adequate interference for the purpose of preventing creep. The inner raceway surface 7 on the outboard side that is formed on the outer peripheral surface of the hub wheel 1 and the inner raceway surface 8 on the inboard side that is formed on the outer peripheral surface of the inner race 2 constitute double-row raceway surfaces. The inner race 2 is press-fitted to the small-diameter step portion 12 of the hub wheel 1, and the end portion of the small-diameter step portion 12 is crimped outward by orbital forming. As a result, the inner race 2 is retained by a crimped portion 11 and integrated with the hub wheel 1, to thereby apply preload to the wheel bearing 20.

Figure 3:
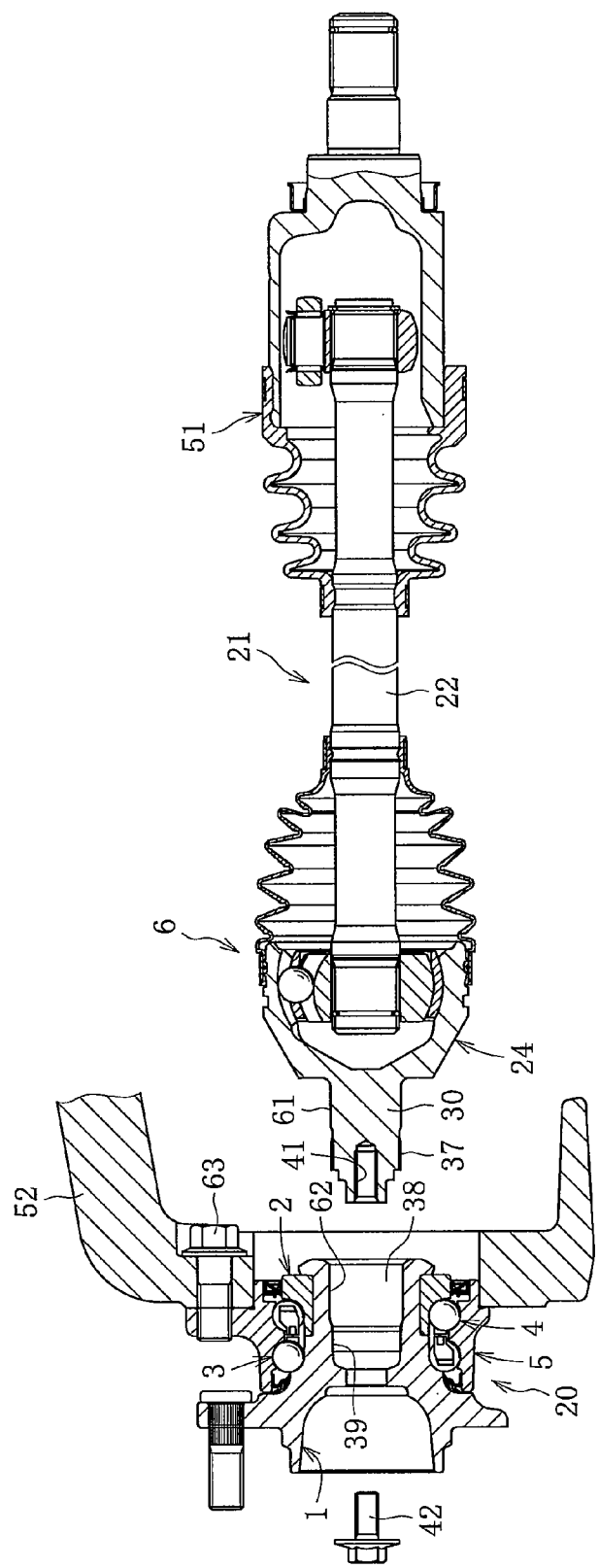
FIG. 3 is a sectional view illustrating a state before assembling the constant velocity universal joint of a drive shaft to the wheel bearing mounted to a knuckle.

The outer race 5 has double-row outer raceway surfaces 13 and 14 formed on an inner peripheral surface thereof so as to be opposed to the inner raceway surfaces 7 and 8 of the hub wheel 1 and the inner race 2, and comprises a vehicle body mounting flange 19 for being mounted to a knuckle 52 extending from a suspension device of a vehicle body (not shown). As described later, the vehicle body mounting flange 19 is fitted to the above-mentioned knuckle 52, and is fixed thereto with bolts 63 (see FIG. 3).

The wheel bearing 20 has a double-row angular ball bearing structure. Specifically, the rolling elements 3 and 4 are interposed between the inner raceway surfaces 7 and 8 formed on the outer peripheral surfaces of the hub wheel 1 and the inner race 2 and the outer raceway surfaces 13 and 14 formed on the inner peripheral surface of the outer race 5, and the rolling elements 3 and 4 in respective rows are equiangularly supported by cages 15 and 16.

At opening portions on both ends of the wheel bearing 20, a pair of seals 17 and 18 for sealing annular spaces between the outer race 5 and the hub wheel 1 and between the outer race 5 and the inner race 2 so as to be held in sliding-contact with the outer peripheral surfaces of the hub wheel 1 and the inner race 2 are fitted to the inner diameter portions at both end portions of the outer race 5. Further, the seals 17 and 18 prevent leakage of grease filled inside and intrusion of water and foreign matter from the outside.

The constant velocity universal joint 6 comprises an outer joint member 24 provided at one end of an intermediate shaft 22 that constitutes a drive shaft 21, the outer joint member 24 having track grooves 23 formed in an inner peripheral surface thereof, an inner joint member 20 having track grooves 25 formed in an outer peripheral surface thereof so as to be opposed to the track grooves 23 of the outer joint member 24, balls 27 built into spaces between the track grooves 23 of the outer joint member 24 and the track grooves 25 of the inner joint member 26, and a cage 28 interposed between the inner peripheral surface of the outer joint member 24 and the outer peripheral surface of the inner joint member 26 to retain the balls 27.

The outer joint member 24 comprises a mouth section 29 that accommodates internal components such as the inner joint member 26, the balls 27, and the cage 28, and a stem section 30 that integrally extends from the mouth section 25 in an axial direction. An axial end of the intermediate shaft 22 is press-fitted to the inner joint member 26, and is coupled by spline fitting to allow torque transmission therebetween.

A bellows-like boot 31 made of a resin is mounted between the outer joint member 24 of the constant velocity universal joint 6 and the intermediate shaft 22 to prevent leakage of a lubricant such as grease filled inside the joint, and to prevent intrusion of foreign matter from outside the joint, thereby attaining a structure of closing an opening portion of the outer joint member 24 with the boot 31.

The boot 31 comprises a large-diameter end portion 33 fastened and fixed with a boot band 32 on an outer peripheral surface of the outer joint member 24, a small-diameter end portion 35 fastened and fixed with a boot band 34 on an outer peripheral surface of the intermediate shaft 22, and a flexible bellows portion 36 connecting the large-diameter end portion 33 and the small-diameter end portion 35, and reduced in diameter in a range of from the large-diameter end portion 33 toward the small-diameter end portion 35.

In this wheel bearing device, a columnar fitting surface 61 is formed on an outer peripheral surface of the stem section 30 of the outer joint member 24 on the inboard side, and a male spline comprising a plurality of projecting portions 37 extending in the axial direction is formed on an outer peripheral surface of the stem section 30 on the outboard side. On the other hand, a cylindrical fitting surface 62 is formed on an inner peripheral surface of a shaft hole 38 of a hub wheel 1 on the inboard side, and a plurality of depressed portions 39 (pre-formed depressed portions) having an interference with respect to the above-mentioned projecting portions 37 are formed on an inner peripheral surface of the shaft hole 38 on the outboard side (see FIG. 1).

In this wheel bearing device, the stem section 30 of the outer joint member 24 is press-fitted to the shaft hole 38 of the hub wheel 1, and the shape of the projecting portions 37 is transferred to the shaft hole 38 of the hub wheel 1 serving as a depressed portion forming surface on the mating side, to thereby form depressed portions 40. In this manner, there is attained a projection and depression fitting structure M in which the projecting portions 37 and the depressed portions 40 are brought into close contact with each other at an entire fitting contact portion X therebetween (see FIG. 2).

This wheel bearing device comprises the following screw fastening structure N (see FIG. 2). This screw fastening structure N comprises a female thread portion 41 formed at an axial end of the stem section 30 of the outer joint member 24, and a bolt 42 serving as a male thread portion to be locked at the hub wheel 1 in a state of being threadedly engaged with the female thread portion 41. In this structure, the bolt 42 is threadedly engaged with the female thread portion 41 of the stem section 30, and is therefore fastened in a state of being locked at the hub wheel 1, to thereby fix the constant velocity universal joint 6 to the hub wheel 1. Mote that, the wheel bearing 20 has a structure in which the inner race 2 is retained by a crimping portion 11 and integrated with the hub wheel 1. Thus, the wheel bearing 20 is separable from the outer joint member 24 of the constant velocity universal joint 6.

In this wheel bearing device, the fixed type constant velocity universal joint 6 to be coupled to the wheel bearing 20 comprising the hub wheel 1, the inner race 2, the double-row rolling elements 3 and 4, and the outer race 5 constitutes a part of the drive shaft 21. It is necessary that the drive shaft 21 for transmitting power from an engine to a wheel of an automobile be adaptable to angular displacement and axial displacement caused by a change in relative positional relationship between the engine and the wheel, and hence, as in the structure illustrated in FIG. 3, a plunging type constant velocity universal joint 51 and the fixed type constant velocity universal joint 6 axe generally installed on the engine side (inboard side) and the wheel side (outboard side), respectively, and both the constant velocity universal joints 6 and 51 are coupled to each other through the intermediate shaft 22.

Figure 27:
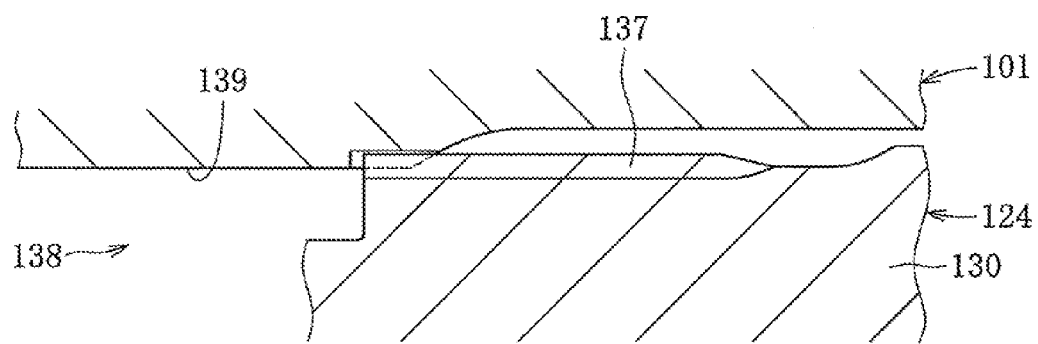
FIG. 27 is an enlarged main part vertical sectional view illustrating a state before press-fitting a stem section of an outer joint member to a shaft hole of a hub wheel in the wheel bearing device of FIG. 26.
Figure 28:
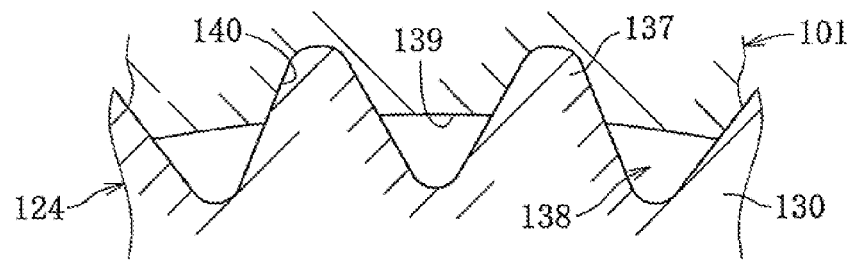
FIG. 28 is an enlarged main part lateral sectional view illustrating a state after press-fitting the stem section of the outer joint member to the shaft hole of the hub wheel in the wheel bearing device of FIG. 26.
Figure 29:
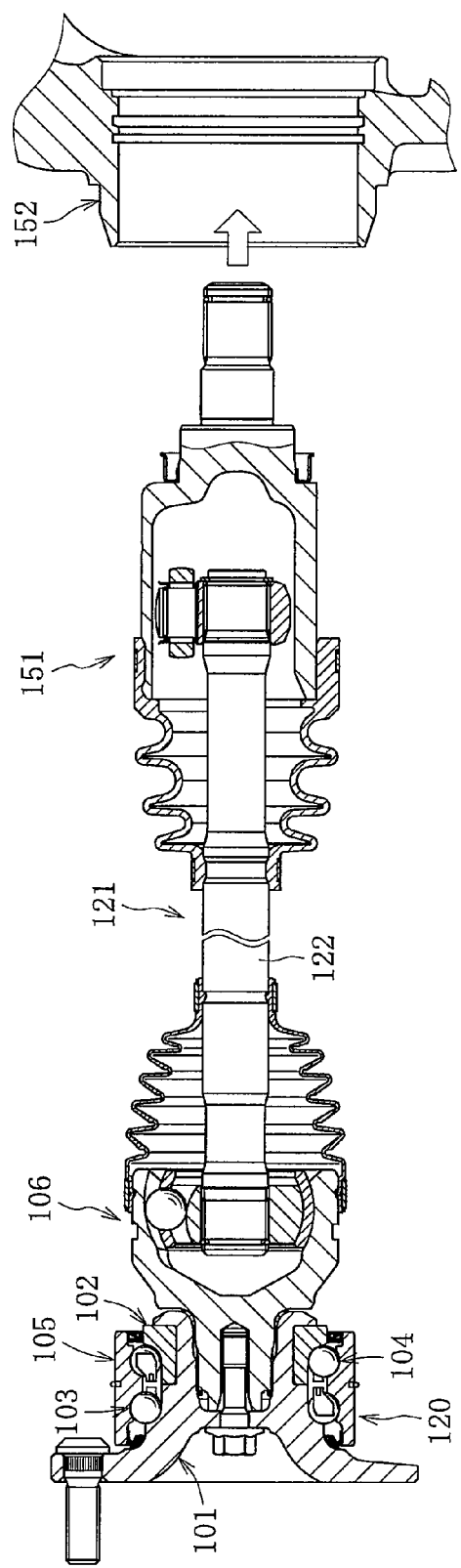
FIG. 29 is a sectional view illustrating a state before mounting, to a knuckle, a wheel bearing device having a drive shaft assembled thereto.
Figure 30:
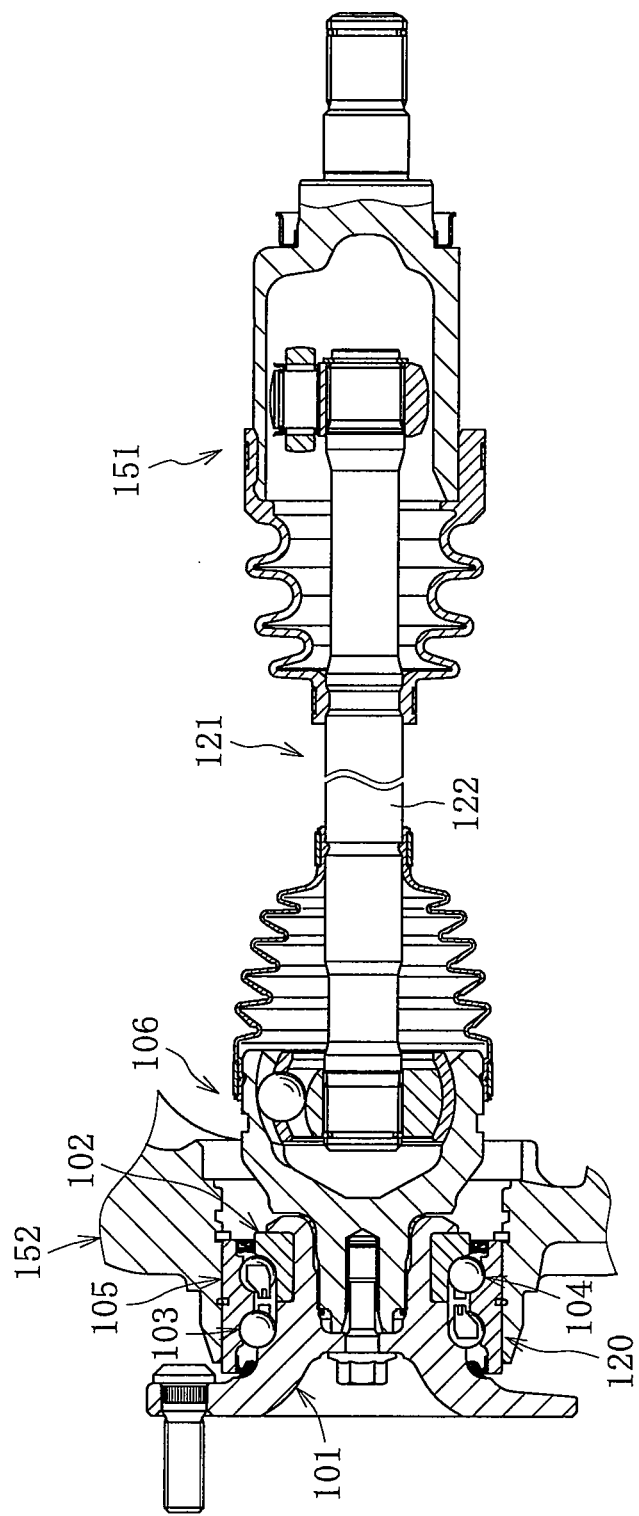
FIG. 30 is a sectional view illustrating a state after mounting, to the knuckle, the wheel bearing device having the drive shaft assembled thereto.

In the case of this wheel bearing device, the depressed portions 39 having the interference with respect to the projecting portions 37 are formed in advance, and hence the press-fitting load to be applied when the projecting portions 37 and the depressed portions 40 are brought into close contact with each other at the entire fitting contact portion X therebetween can further be reduced as compared to the related art in which the shape of the projecting portions 137 is transferred to the cylindrical portion 139 (see FIG. 27). As a result, at the time of assembling the vehicle in an automobile manufacturer, after the wheel bearing 20 is fixed with the bolt 63 to the knuckle 52 extending from the suspension device of the vehicle body, the stem section 30 of the outer joint member 24 of the constant velocity universal joint 6 can be press-fitted to the shaft hole 38 of the hub wheel 1 of the wheel bearing 20 due to a pull-in force generated by the bolt 42 of the screw fastening structure P. Thus, the constant velocity universal joint 6 of the drive shaft 21 can easily be assembled to the wheel bearing 20.

Figure 4:
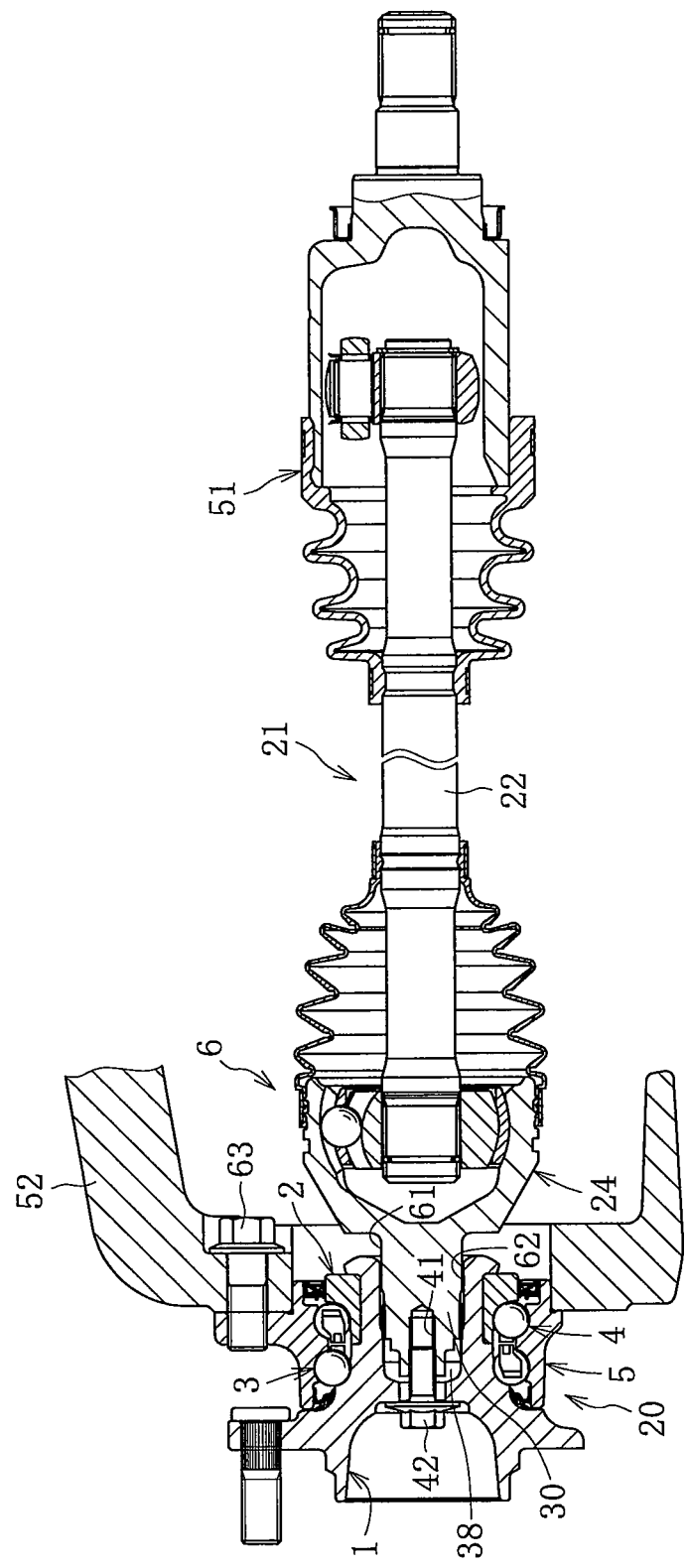
FIG. 4 is a sectional view illustrating a state in the middle of assembling the constant velocity universal joint of the drive shaft to the wheel bearing mounted to the knuckle.

Note that, as illustrated in FIG. 4, prior to press-fitting the stem section 30 of the outer joint member 24 to the shaft hole 38 of the hub wheel 1, the columnar fitting surface 61 is formed on the outer peripheral surface of the stem section 30 on the inboard side, and the cylindrical fitting surface 62 is formed on the inner peripheral surface of the shaft hole 36 of the hub wheel 1 on the inboard side. Thus, the axial alignment of the stem section 30 with the hub wheel 1 can easily be carried out by fitting the fitting surface 61 of the stem section 30 to the fitting surface 62 of the shaft hole 38 of the hub wheel 1.

Figure 6A:
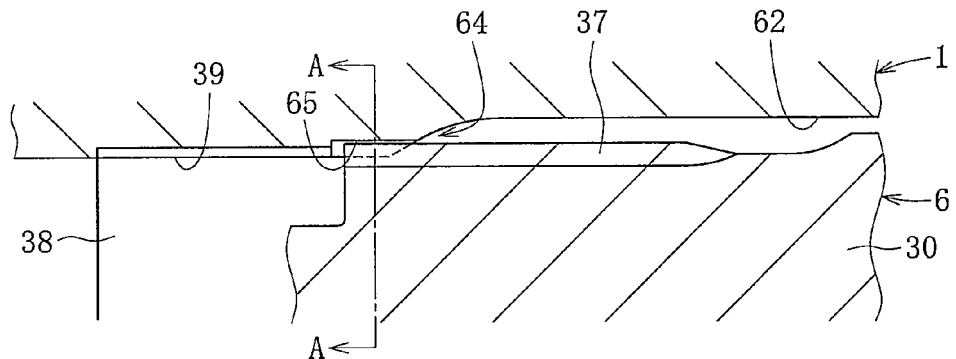
FIG. 6A is an enlarged main part sectional view illustrating a state before press-fitting a stem section of an outer joint member to a hub wheel of the wheel bearing.
Figure 6B:
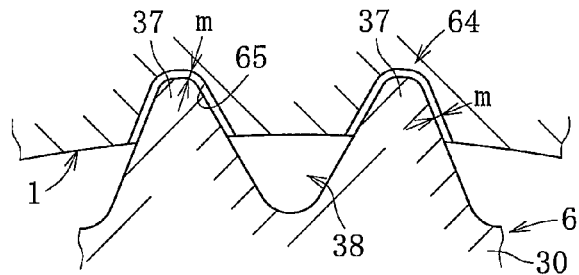
FIG. 6B is a sectional view taken along the line A-A of FIG. 6A.

Further, as illustrated in FIGS. 6A and 6B, a guide portion 64 for guiding the start of the press fitting is provided between the fitting surface 62 positioned on the inboard side of the hub wheel 1 and the depressed portions 39 positioned on the outboard side thereof. The guide portion 64 comprises depressed portions 65 (recessed portions) formed relatively larger than the projecting portions 37 of the stem section 30 (see the enlarge portion of FIG. 1). That is, gaps m are formed between the projecting portions 37 and the depressed portions 65 (see FIG. 6B). When press-fitting the stem section 30 of the outer joint member 24 to the hub wheel 1, the guide portion 64 can guide the projecting portions 37 of the stem section 30 so that the projecting portions 37 are reliably press-fitted to the depressed portions 39 of the hub wheel 1. Thus, stable press fitting can be carried out to prevent axial misalignment, axial inclination, and the like at the time of press fitting.

Figure 7A:
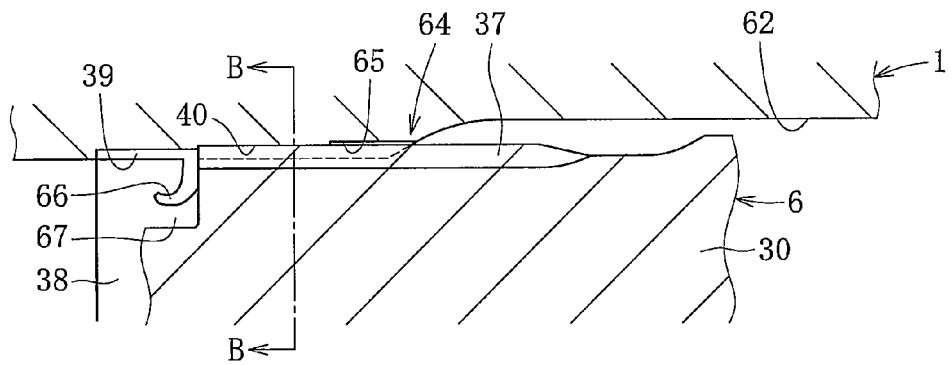
FIG. 7A is an enlarged main part sectional view illustrating a state in the middle of press-fitting the stem section of the outer joint member to the hub wheel of the wheel bearing.
Figure 7B:
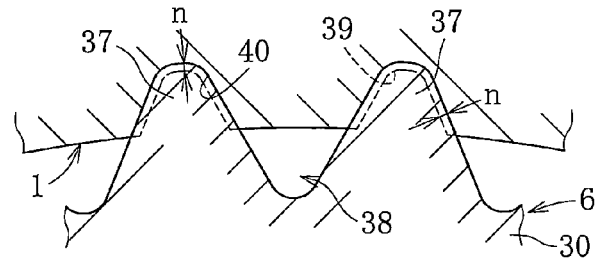
FIG. 7B is a sectional view taken along the line B-B of FIG. 7A.

In this case, as illustrated in FIGS. 7A and 7B, the above-mentioned depressed portions 39 are set smaller than the projecting portions 37 so that the depressed portions 39 have an interference n (see FIG. 7B) with respect to the projecting portions 37. To set the depressed portions 39 smaller than the projecting portions 37 as described above, it is only necessary that the radial dimension and the peripheral dimension of the depressed portions 39 be set smaller than those of the projecting portions 37 (see FIG. 7B).

Figure 8A:
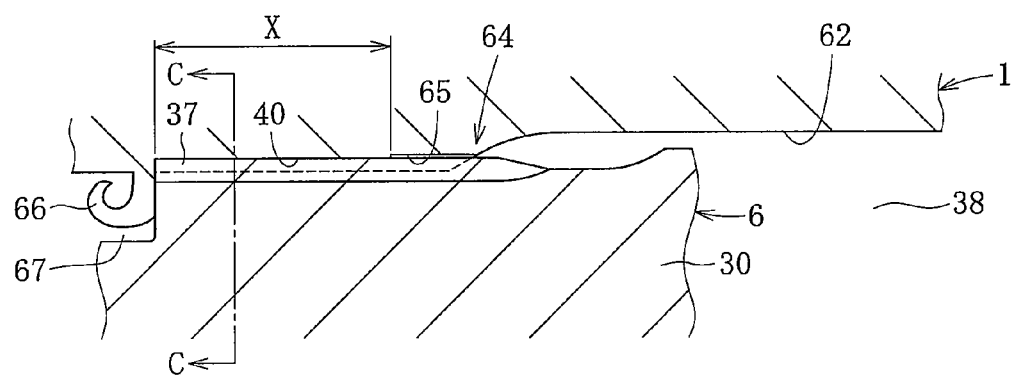
FIG. 8A is an enlarged main part sectional view illustrating a state after press-fitting the stem section of the outer joint member to the hub wheel of the wheel bearing.
Figure 8B:
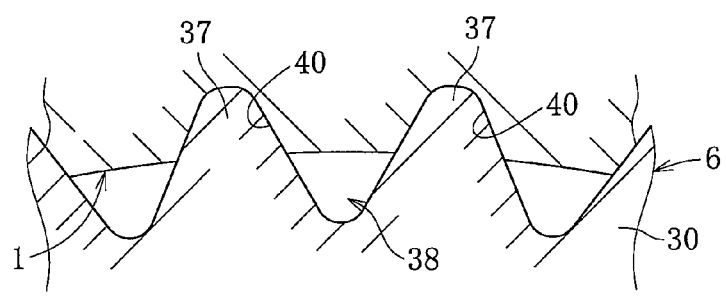
FIG. 8B is a sectional view taken along the line C-C of FIG. 8A.

As illustrated in FIGS. 8A and 8B, in the case where the shape of the projecting portions 37 is transferred to the shaft hole 38 of the hub wheel 1 to form the depressed portions 40 at the time of press fitting the stem section 30 to the hub wheel 1, the depressed portions 39 having the interference n with respect to the projecting portions 37, that is, the depressed portions 39 set smaller than the projecting portions 37 are formed in advance, and hence the press-fitting load to be applied when the projecting portions 37 and the depressed portions 40 are brought into close contact with each other at the entire fitting contact portion X therebetween (see FIG. 2) can further be reduced as compared to the related art in which the shape of the projecting portions 137 is transferred to the cylindrical portion 139 (see FIG. 27).

Figure 5:
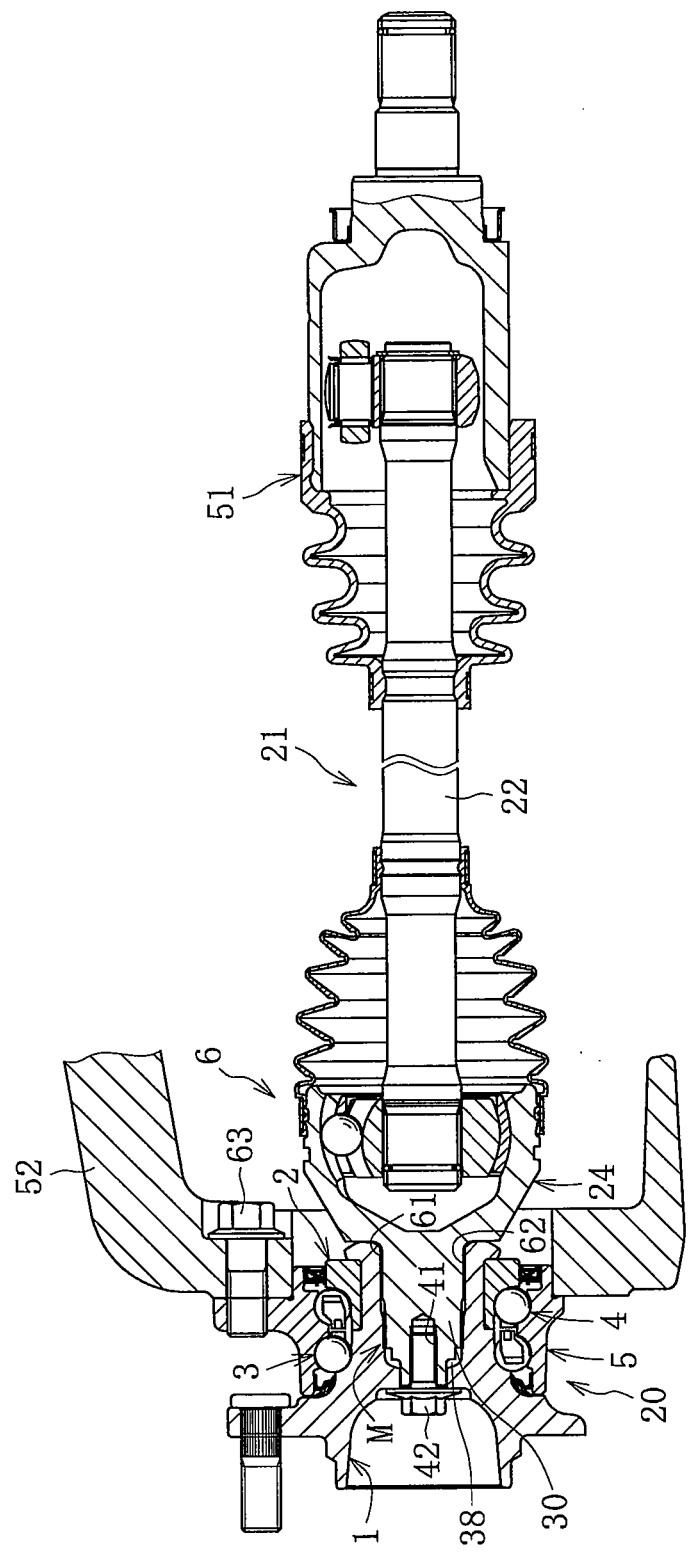
FIG. 5 is a sectional view illustrating a state after assembling the constant velocity universal joint of the drive shaft to the wheel bearing mounted to the knuckle.

As a result, as illustrated in FIG. 5, the outer joint member 24 can be press-fitted to the hub wheel 1 due to a force that is equal to or smaller than an axial force generated by fastening the bolt 42. That is, after the wheel bearing 20 is mounted to the knuckle 52 of the vehicle body, the outer joint member 24 is press-fitted to the hub wheel 1 of the wheel bearing 20 due to the pull-in force of the bolt 42 so that the constant velocity universal joint 6 is easily coupled to the wheel bearing 20. Thus, the workability can be enhanced when assembling the wheel bearing device to the vehicle body, and the damage to the components can be forestalled at the time of assembling the wheel bearing device.

As described above, there is no need to separately prepare a dedicated jig when press-fitting the outer joint member 24 to the hub wheel 1 of the wheel bearing 20 after the wheel bearing 20 is mounted to the knuckle 52 of the vehicle body. Instead, the constant velocity universal joint 6 can easily be coupled to the wheel bearing 20 with the bolt 42 that is a component of the wheel bearing device. Further, the outer joint member 24 can be press-fitted by applying the relatively small pull-in force, which is equal to or smaller than the axial force generated by fastening the bolt 42, and hence the workability car be enhanced when pulling in the outer joint member 24 with the bolt 42. Still further, there is no need to apply a significant press-fitting load, and hence the damage to (collapse of) the projections and depressions can be prevented in the projection and depression fitting structure M, with the result that a high-quality and long-life projection and depression fitting structure M can be realized.

When press-fitting the stem sect ion 30 of the outer joint member 24 to the shaft hole 38 of the hub wheel 1, the shape of the projecting portions 37 is transferred to the depressed portion forming surface while involving plastic deformation and cutting work for the depressed portion forming surface with the projecting portions 37. At this time, the projecting portions 37 dig into the depressed portion forming surface so that the inner diameter portion of the hub wheel 1 is slightly increased. Thus, relative movement of the projecting portions 37 in the axial direction is allowed in this state. When the relative movement of the projecting portions 37 in the axial direction is stopped, the inner diameter portion of the hub wheel 1 is reduced to recover the original diameter.

Thus, the projecting portions 37 and the depressed portions 40 are brought into close contact with each other at the entire fitting contact portion X therebetween, with the result that the outer joint member 24 and the hub wheel 1 can firmly foe coupled to and integrated with each other.

Through the coupling thus carried out at low cost with high reliability, any gap that may cause a backlash is not formed in a radial direction, and a peripheral direction of the fitting portion between the stem section 30 and the hub wheel 1, and hence the entire fitting contact portion X contributes to rotational torque transmission so that stable torque transmission can be carried out. As a result, annoying gear rattling noise can be prevented over a long period of time. The stem section 30 and the hub wheel 1 are thus brought into close contact with each other at the entire fitting contact portion X therebetween, and hence the strength of the torque transmitting portion is enhanced. As a result, the bearing device for a vehicle is light-weighted and downsized.

When press-fitting the stem section 30 of the outer joint member 24 to the shaft hole 38 of the hub wheel 1, the surface hardness of the projecting portions 37 is set larger than the surface hardness of the depressed portions 39. In this case, the difference between the surface hardness of the projecting portions 37 and the surface hardness of the depressed portions 39 is set equal to or larger than 20 HRC. Thus, through the plastic deformation and the cutting work at the time of press fitting, the shape of the projecting portions 37 can easily be transferred to the depressed portion forming surface on the mating side.

An accommodating portion 67 for accommodating a flash portion 66 generated due to the transfer of the shape of the projecting portions through press fitting is provided between the shaft hole 38 of the hub wheel 1 and the stem section 30 of the outer joint member 24 (see FIGS. 7A and 7A). Thus, the flash portion 66 generated due to the transfer of the shape of the projecting portions through press fitting can be kept in the accommodating portion 67, thereby being capable of inhibiting the flash portion 66 from entering, for example, the inside of the vehicle that is positioned outside the device. The flash portion 66 is kept in the accommodating portion 67, and hence the process of removing the flash portion 66 becomes unnecessary so that the number of working steps can foe reduced. As a result, the workability can be enhanced and the cost can be reduced.

Figure 9:
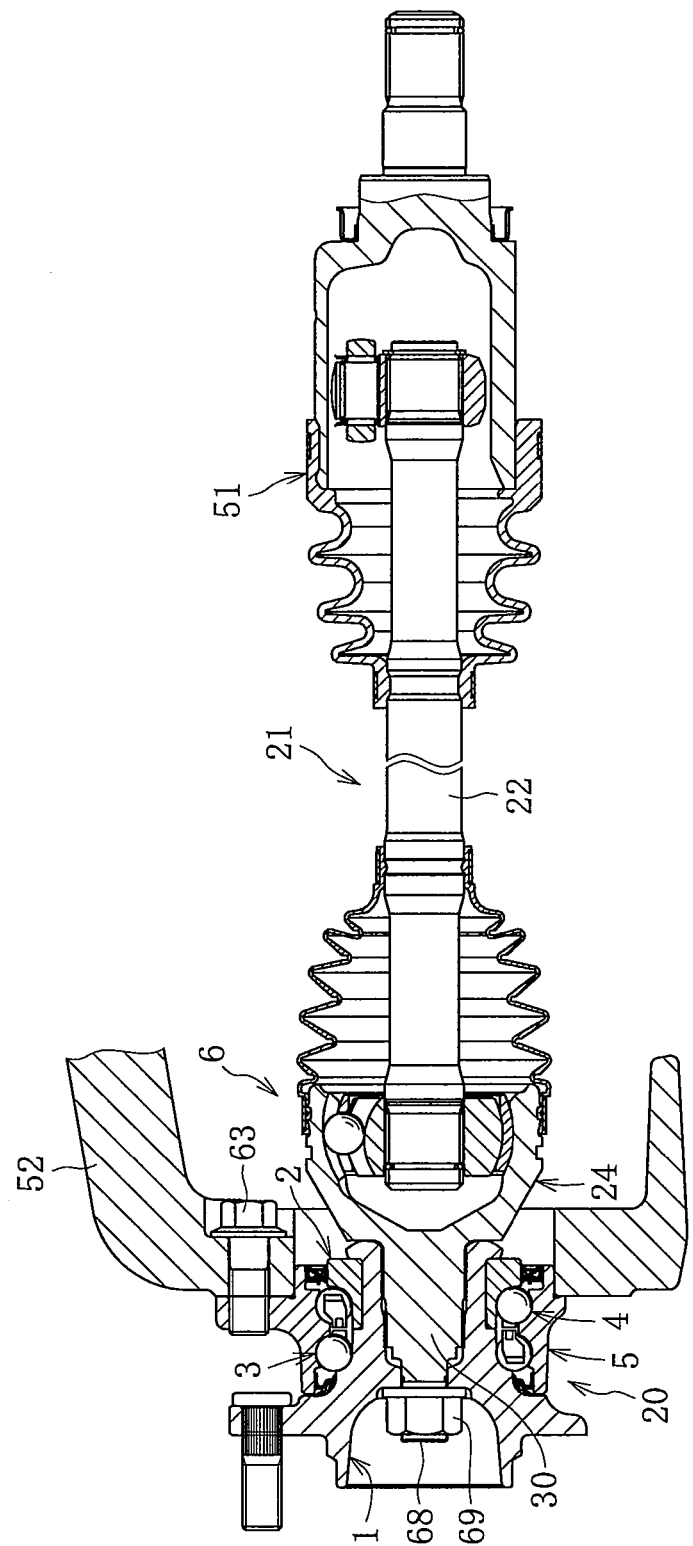
FIG. 9 is a sectional view illustrating a state after assembling the constant velocity universal joint of the drive shaft to the wheel bearing mounted to the knuckle with another screw fastening structure.

Note that, in the embodiment illustrated in FIG. 5, there is exemplified a structure in which the bolt 42 is threadedly engaged with the female thread portion 41 of the stem section 30 and therefore fastened in a state of being locked at the end surface of the hub wheel 1. As an alternative screw fastening structure, as illustrated in FIG. 9, there may be provided a structure comprising a male thread portion 63 formed at the axial end of the stem section 30 of the outer joint member 24, and a nut 69 serving as a female thread portion to be locked at the end surface of the hub wheel 1 in a state of being threadedly engaged with the male thread portion 63. In this structure, the nut 69 is threadedly engaged with the male thread portion 68 of the stem section 30, and is therefore fastened in a state of being locked at the huh wheel 1, to thereby fix the constant velocity universal joint 6 to the hub wheel 1. Note that, in the embodiment of FIG. 9, other components are similar to those in the embodiment of FIG. 5, and hence identical or corresponding parts to those in FIG. 5 are represented by the same reference symbols to omit redundant description thereof.

In the wheel bearing 20 of the embodiment illustrated in FIGS. 1 and 2, the pitch circle diameter (PCD) of the rolling elements 4 (balls) positioned on the inboard side is set equal to the PCD of the rolling elements 3 positioned on the outboard side [ball PCD: Di=Do (see FIG. 2)]. In the case of this projection and depression fitting structure, the inner raceway surface 3 of the inner race 2 of the wheel bearing 20 may be deformed due to a hoop stress generated through expansion of the hub wheel 1 when press-fitting the stem section 30 to the hub wheel 1. To suppress the deformation due to the hoop stress, the projection and depression fitting structure is arranged closer to the outboard side at a position between the double-row rolling elements 3 and 4, that is, arranged closer to the outboard side at a position between the rolling elements 4 positioned on the inboard side and the rolling elements 3 positioned on the outboard side so that the projection and depression fitting structure is spaced apart from the inner raceway surface 8 of the inner race 2 to the extent possible.

Figure 10:
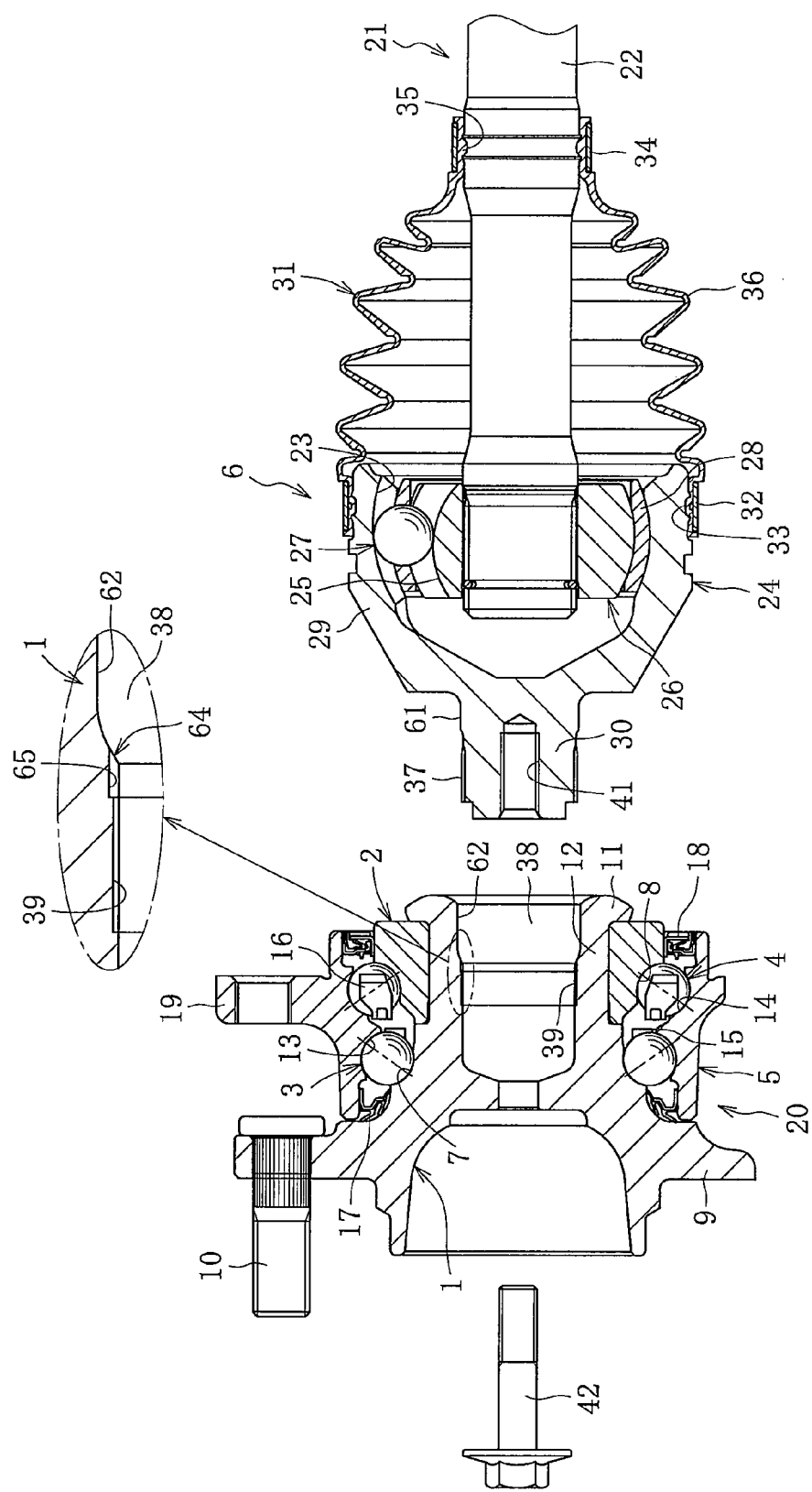
FIG. 10 is a vertical sectional view illustrating a state before assembling a constant velocity universal joint to a wheel bearing having a crimping structure in a wheel bearing device (third generation) according to another embodiment of the present invention.
Figure 11:
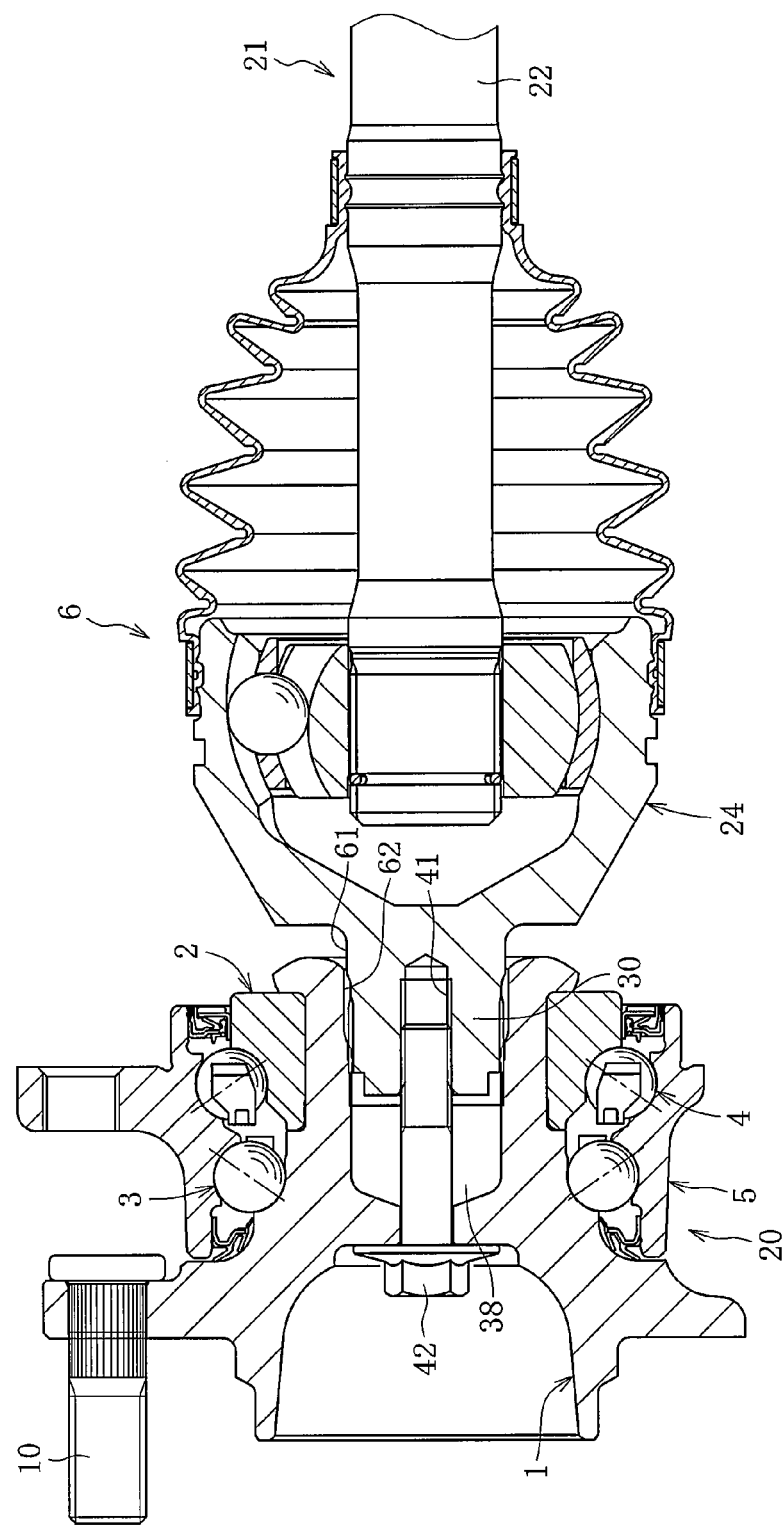
FIG. 11 is a vertical sectional view illustrating a state in the middle of assembling the constant velocity universal joint to the wheel bearing of FIG. 10.
Figure 12:
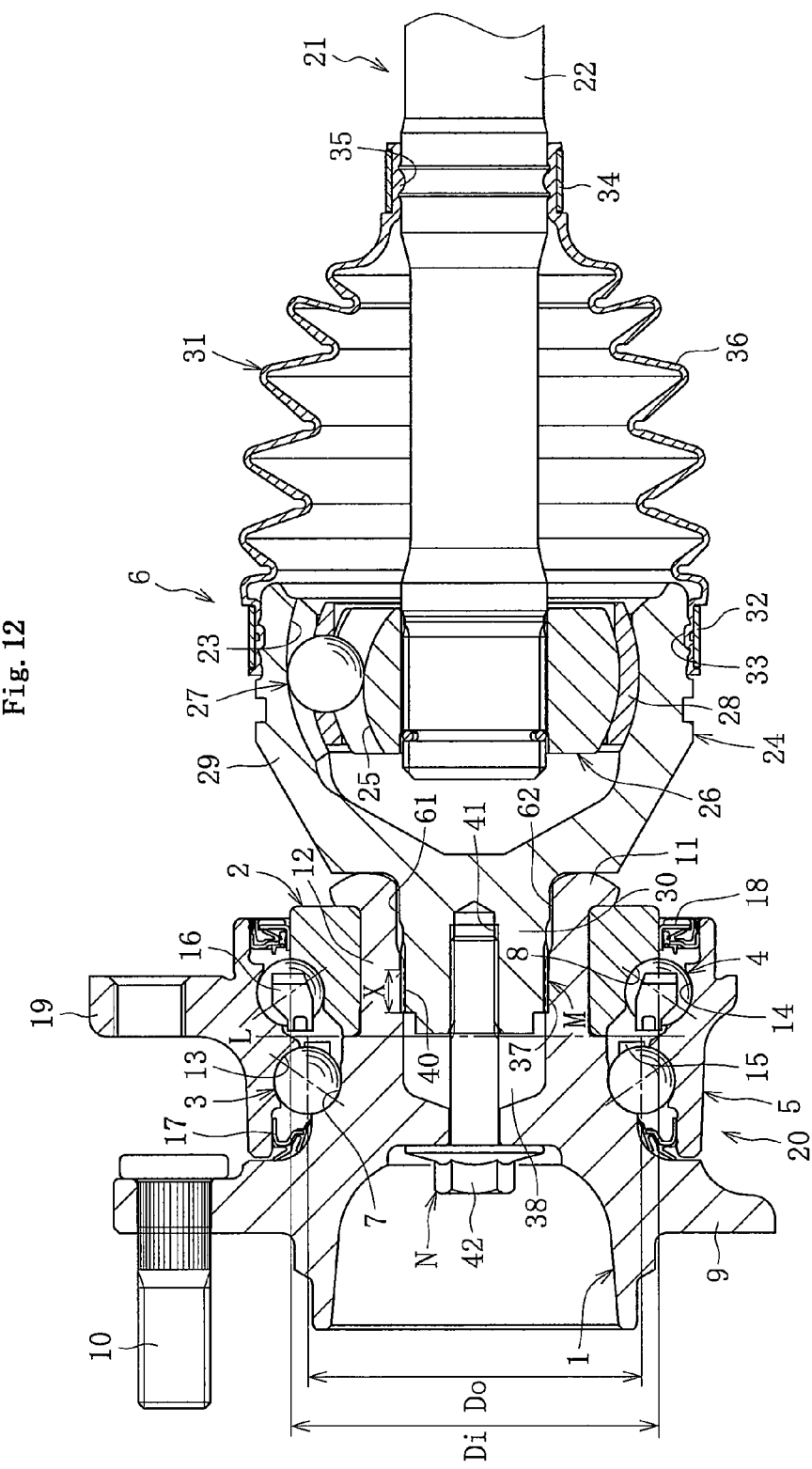
FIG. 12 is a vertical sectional view illustrating a state after assembling the constant velocity universal joint to the wheel bearing of FIG. 10.
Figure 15:
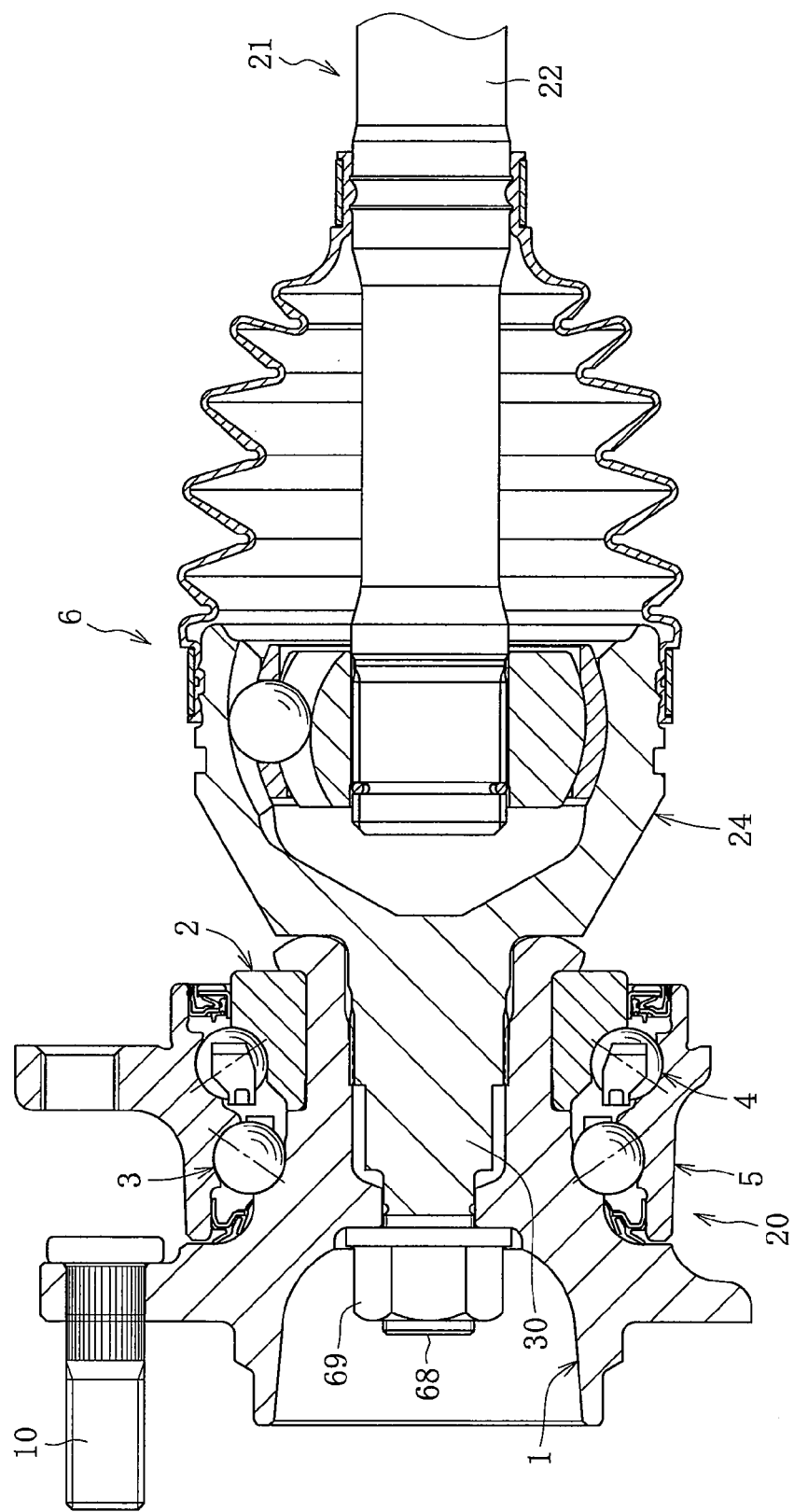
FIG. 15 is a vertical sectional view illustrating a state after assembling the constant velocity universal joint to the wheel bearing of FIG. 10 with another screw fastening structure.

FIGS. 10 to 12 illustrate a wheel bearing device capable of preventing reduction in rolling fatigue life and crack formation of the wheel bearing that may be caused by the generation of the hoop stress, and achieving light-weighting through reduction in length of the stem section. Note that, FIG. 10 illustrates a state before assembling the constant velocity universal joint 6 to the wheel bearing 20, FIG. 11 illustrates a state in the middle of assembling the constant velocity universal joint 6 to the wheel bearing 20, and FIG. 12 illustrates a state after assembling the constant velocity universal joint 6 to the wheel bearing 20. In the embodiment of FIGS. 10 to 12, other components, a procedure of assembling the wheel bearing 20 to the suspension, device of the vehicle body, and a procedure of assembling the constant velocity universal joint G of the drive shaft 21 to the wheel bearing 20 are similar to those in the above-mentioned embodiment illustrated in FIGS. 1 and 2, and hence identical or corresponding parts to those in FIGS. 1 and 2 are represented by the same reference symbols to omit redundant description thereof. Further, FIG. 15 illustrates a screw fastening structure comprising the male thread portion 68 formed at the axial end of the stem section 30 of the outer joint member 24, and the nut 69 serving as a female thread portion to be locked at the end surface of the hub wheel 1 in a state of being threadedly engaged with the male thread portion 68. The screw fastening structure illustrated in FIG. 15 is similar to that in the above-mentioned embodiment illustrated in FIG. 9, and hence identical or corresponding parts to those in FIG. 9 are represented by the same reference symbols to omit redundant description thereof.

In this wheel bearing 20, among the double-row rolling elements (balls) 3 and 4, the PCD of the rolling elements 4 positioned on the inboard side is set larger than the PCD of the rolling elements 3 positioned on the outboard side [ball PCD: Di>Do (see FIG. 12)]. The PCD of the rolling elements 4 positioned on the inboard side is thus set larger than the PCD of the rolling elements 3 positioned on the outboard side, and hence the thickness of the inner race 2 having the inner raceway surface 8 on the inboard side formed thereon can further be increased as compared to the inner race 2 of the above-mentioned wheel bearing device (see FIG. 2). Note that, the projection and depression fitting structure M is arranged on the inboard side with respect to a bearing center L. The bearing center L herein refers to an axial center position between the rolling elements 3 positioned on the outboard side and the rolling elements 4 positioned on the inboard side (see the chain line of FIG. 12).

As described above, among the double-row rolling elements 3 and 4, the PCD of the rolling elements 4 positioned on the inboard side is set larger than the PCD of the rolling elements 3 positioned on the outboard side, and hence the thickness of the inner race 2 having the inner raceway surface 8 on the inboard side formed thereon can further be increased as compared to the inner race 2 of the above-mentioned wheel bearing device (see FIG. 2). Through the increase in thickness of the inner race 2, the hoop stress that may be generated due to the press fitting of the projecting portions 37 can be suppressed. As a result, through the arrangement of the projection and depression fitting structure U on the inboard side with respect to the bearing center L, that is, through the arrangement of the entire fitting contact portion X on the inner periphery of the hub wheel 1 that is positioned at a groove bottom of the inner raceway surface 8 of the inner race 2, the axial dimension of the stem section 30 of the outer joint member 24 can be reduced, and the outer joint member 24 can be light-weighted.

Figure 13:
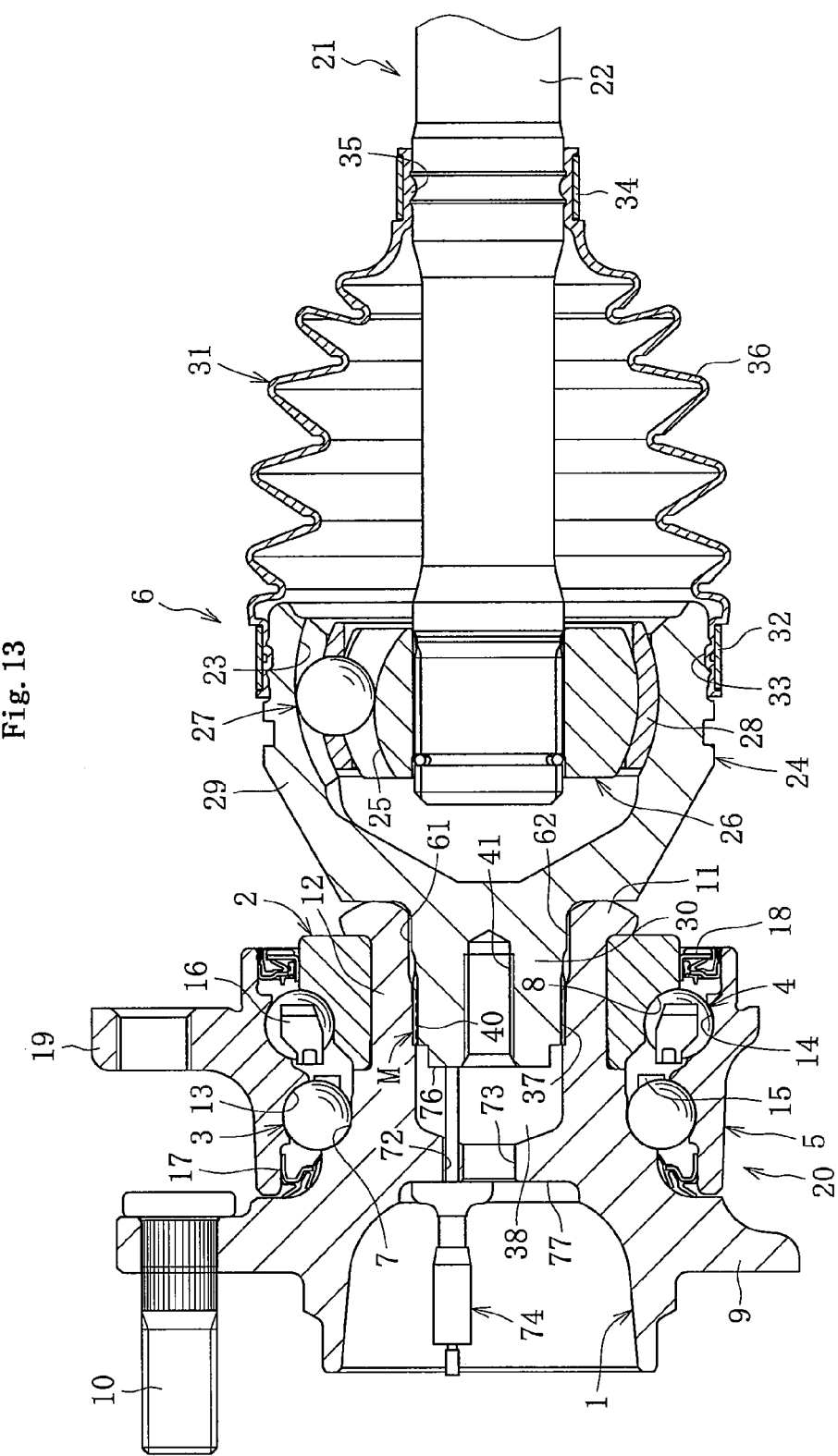
FIG. 13 is a vertical sectional view illustrating a state of confirming a press-fitting position of a stem section through use of a depth gauge in the wheel bearing device of FIG. 12.
Figure 14:
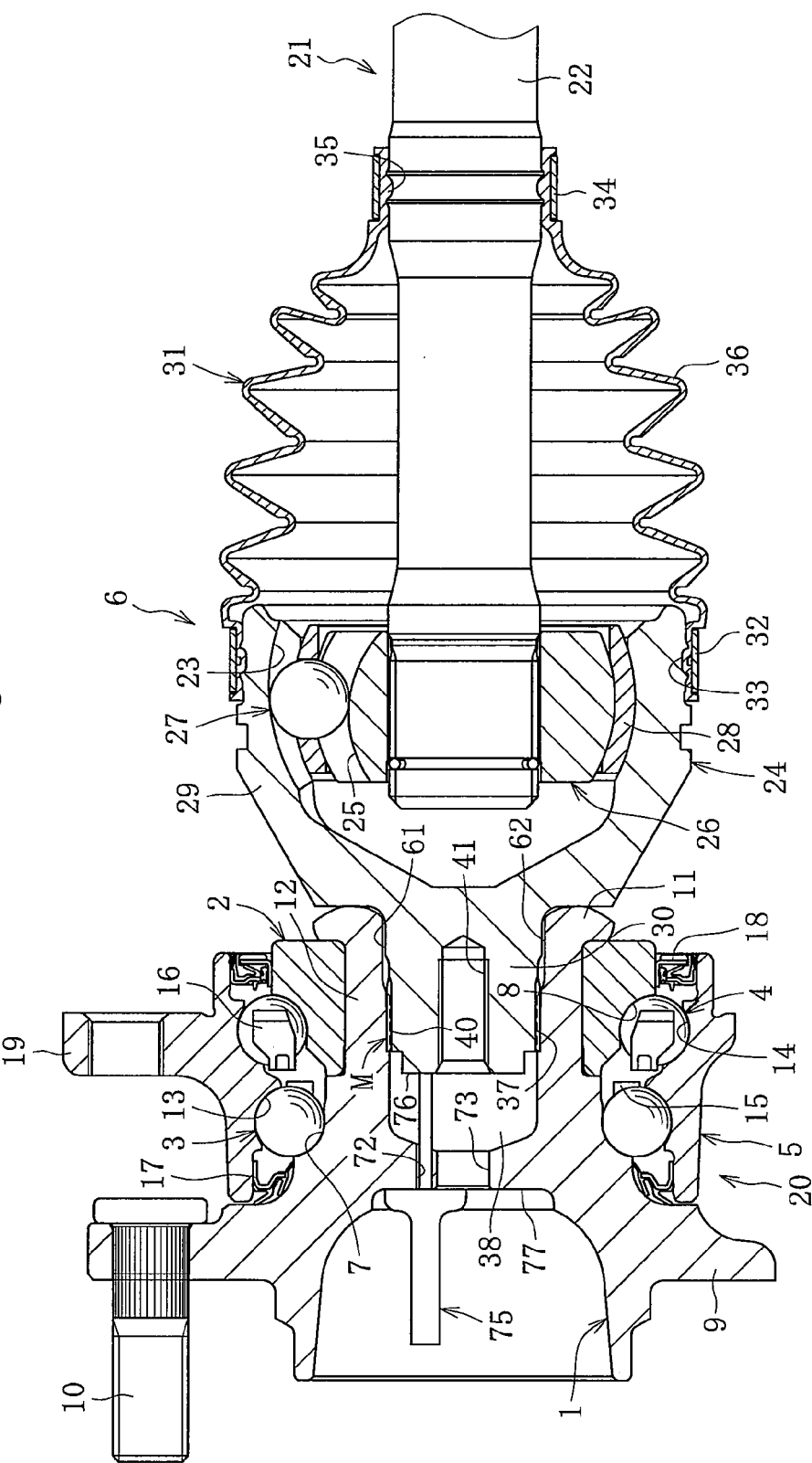
FIG. 14 is a vertical sectional view illustrating a state of confirming the press-fitting position of the stem section through use of a reference jig in the wheel bearing device of FIG. 12.

Further, when press-fitting the stem section 30 to the hub wheel 1, it cannot be confirmed from the outside whether or not the press fitting is completed at a normal position. The axial length of the projection and depression fitting structure may become smaller due to incomplete press fitting, and hence stable torque transmission may become difficult. Therefore, as illustrated in FIGS. 13 and 14, there is provided a structure in which a cutout hole 72 for confirming the press-fitting position of the projecting portions 37 is provided continuously with a bolt insertion hole 73 of the hub wheel 1. The stem section 30 of the outer joint member 24 is press-fitted to the shaft hole 38 of the hub wheel 1 due to the pull-in force generated by fastening the bolt 42, and then the bolt 42 is temporarily removed. Then, a depth gauge 74 (see FIG. 13) or a reference jig 75 (see FIG. 14) is mounted through the cutout hole 72 provided in the bolt insertion hole 73 of the hub wheel 1, and the distal end of the depth gauge 74 or the reference jig 75 is brought into abutment against a distal end surface 76 of the stem section 30. In this manner, it is confirmed whether or not the value of the axial dimension in a range of from an outer wall surface 77 of the hub wheel 1 to the distal end surface 76 of the stem section 30 is a specific value.

In the case of the depth gauge 74, as illustrated in FIG. 13, the distal end of the depth gauge 74 is brought into abutment against the distal end surface 76 of the stem section 30 through the cutout hole 72 of the hub wheel 1, to thereby measure the position of the distal end surface of the stem section 30. When the measurement value of the axial dimension in the range of from the outer wall surface 77 of the hub wheel 1 to the distal end surface 76 of the stem section 30 is the specific value, it is understood that the press fitting is completed at the normal position. When the measurement value deviates from the specific value, on the other hand, it is only necessary that adjustment be carried out with the bolt 42 inserted again.

On the other hand, the reference jig 75 has its distal end processed into a length having the above-mentioned specific value. As illustrated in FIG. 14, the distal end of the reference jig 75 is inserted through the cutout hole 72 of the hub wheel 1. When the distal end abuts against the distal end surface 76 of the stem section 30, it is understood that the press fitting is completed at the normal position. When the distal end of the reference jig 75 does not abut against the distal end surface 76 of the stem section 30, on the other hand, it is only necessary that adjustment be carried out with the bolt 42 inserted again.

As described above, the depth gauge 74 or the reference jig 75 is mounted through the cutout hole 72 of the hub wheel 1, and hence the press-fitting position of the projecting portions 37 can be confirmed. As a result, a normal press-fitting state of the projecting portions 37 can easily be secured so that stable torque transmission can be achieved. Note that, in the case of the reference jig 75, the measurement to be carried out through use of the depth gauge 74 or the like becomes unnecessary so that the workability can be enhanced. The confirmation of the press-fitting state through use of the depth gauge 74 or the reference jig 75 is effective in a case where the projection and depression fitting structure H is arranged on the inboard side with respect to the bearing center L as in the present invention to reduce the axial dimension of the stem section 30 of the outer joint member 24.

Figure 16:
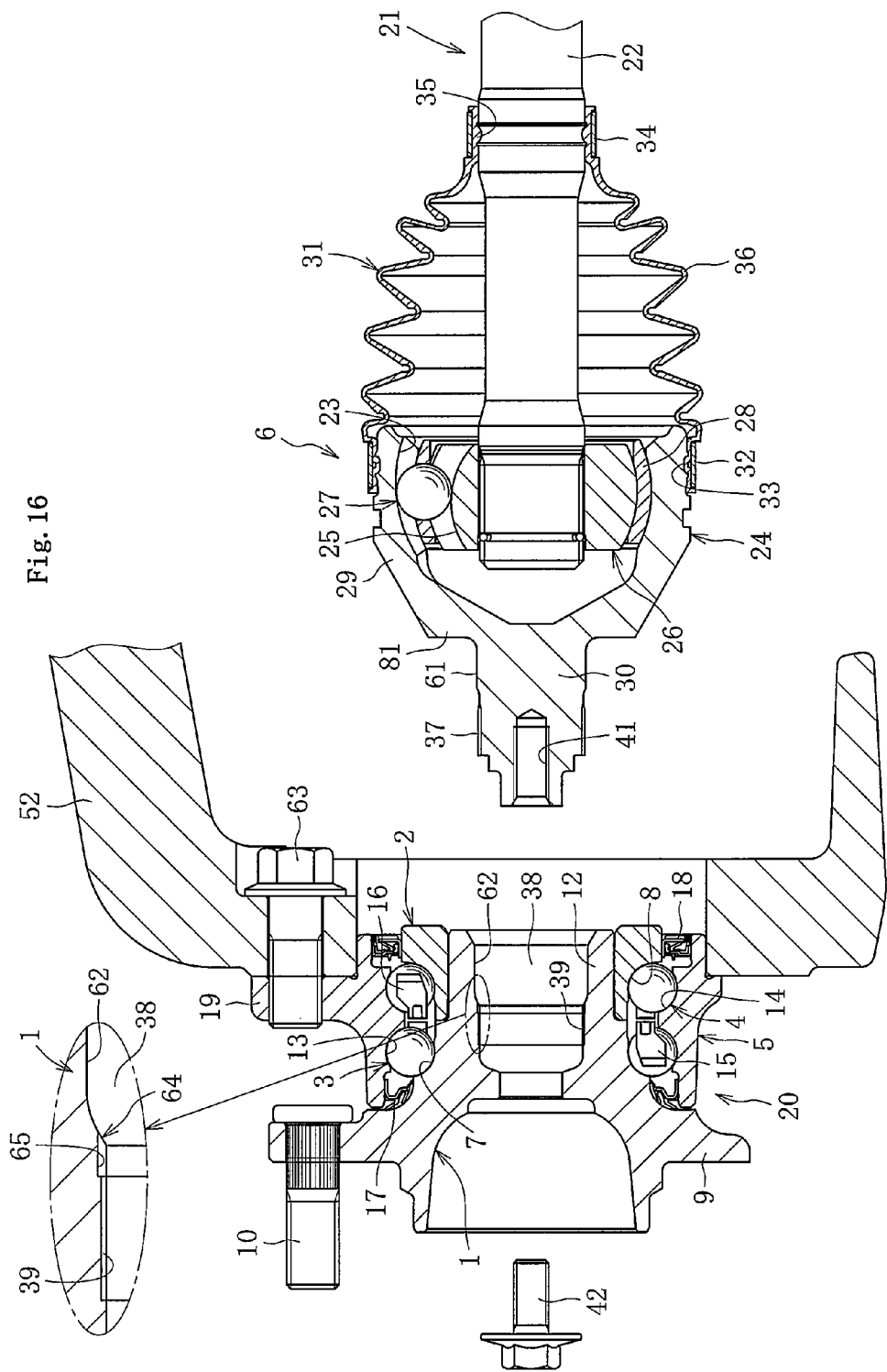
FIG. 16 is a sectional view illustrating a state before assembling a constant velocity universal joint to a wheel bearing having a non-crimping structure that is mounted to a knuckle in a wheel bearing device (third generation) according to another embodiment of the present invention.
Figure 17:
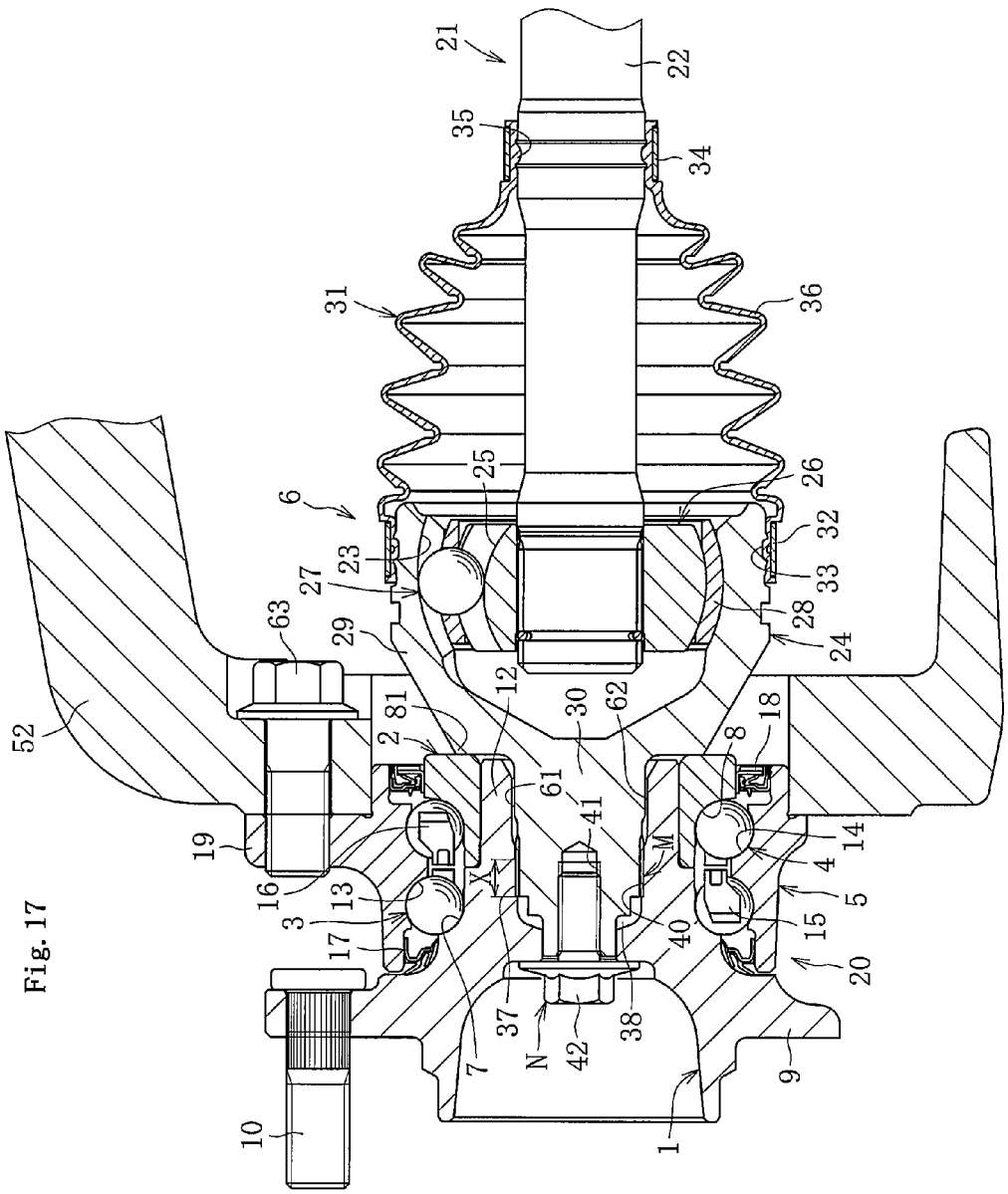
FIG. 17 is a sectional view illustrating a stare after assembling the constant velocity universal joint to the wheel bearing of FIG. 16.

In the embodiment illustrated in FIGS. 1 and 2, there is exemplified a crimping structure in which the end portion of the small-diameter step portion 12 of the hub wheel 1 is crimped outward by orbital, forming and thus the inner race 2 is retained by the crimping portion 11 and integrated with the hub wheel 1, to thereby apply preload to the wheel bearing 20. However, a non-crimping structure as illustrated in FIGS. 16 and 17 may be employed instead. FIG. 16 illustrates a state before assembling the constant velocity universal joint 6 to the wheel bearing 20 that is mounted to the knuckle 52. FIG. 17 illustrates a state after assembling the constant velocity universal joint 6 to the wheel bearing 20. In this embodiment, there is provided a structure in which the inner race 2 is press-fitted to the small-diameter step portion 12 of the hub wheel 1 and the end surface of the inner race 2 is brought into abutment against the end surface of a shoulder portion 81 of the outer joint member 24. When this structure is employed, the crimping portion 11 (see FIGS. 1 and 2) is not provided, and hence the light-weighting is achieved. Further, the process involving the orbital forming becomes unnecessary so that the cost is reduced.

In this non-crimping structure, the bolt 42 is threadedly engaged with the female thread portion 41 of the stem section 30, to thereby apply preload to the wheel bearing 20 due to the axial force generated by fastening the bolt 42. Thus, the use of the bolt 42 subjected to surface treatment with an axial force stabilizer is effective in that fluctuation in axial force with respect to the fastening torque of the bolt 42 can be reduced. The bolt 42 thus subjected to the axial force stabilizing treatment may also be used in the embodiment illustrated in FIGS. 1 and 2. Further, in this non-crimping structure, there may be provided a screw fastening structure in which the nut 69 is threadedly engaged with the male thread portion 68 of the stem section 30 (see FIG. 9), and still further, the PCD of the rolling elements 4 positioned on the inboard side may be set larger than the PCD of the rolling elements 3 positioned on the outboard side (see FIG. 12).

Note that, in the embodiment of FIGS. 16 and 17, other components, a procedure of assembling the wheel bearing 20 to the suspension device of the vehicle body, and a procedure of assembling the constant velocity universal joint 6 of the drive shaft 21 to the wheel bearing 20 are similar to those in the embodiment of FIGS. 1 and 2, and hence identical or corresponding parts to those in FIGS. 1 and 2 are represented by the same reference symbols to omit redundant description thereof.

Further, in the embodiments described above, there is exemplified a case where the present invention is applied to a wheel bearing device of the type in which one of the double-row inner raceway surfaces 7 and 8 formed on the inner member comprising the hub wheel 1 and the inner race 2, that is, the inner raceway surface 7 on the outboard side is formed on the outer periphery of the hub wheel 1 (referred to as "third generation"). However, the present invention is not limited thereto, but is also applicable to a wheel bearing device of the type in which a pair of inner races is press-fitted to the outer periphery of the hub wheel and the raceway surface 7 on the outboard side is formed on the outer periphery of one of the inner races, while the raceway surface 8 on the inboard side is formed on the outer periphery of the other of the inner races (referred to as "first and second generations").

Figure 18:
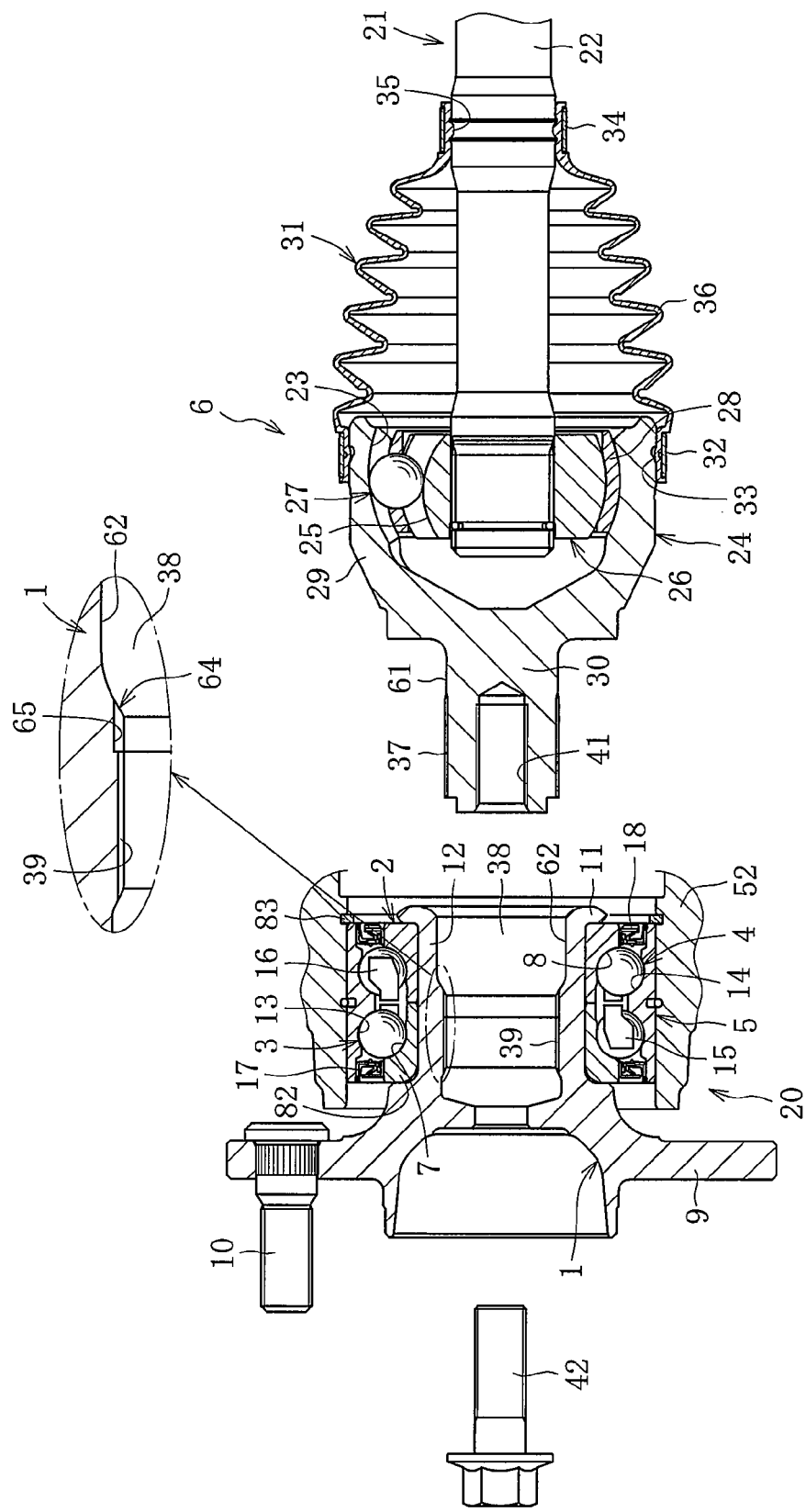
FIG. 18 is a sectional view illustrating a state before assembling a constant velocity universal joint to a wheel bearing having a crimping structure that is mounted to a knuckle in a wheel bearing device (first generation) according to another embodiment of the present invention.
Figure 19:
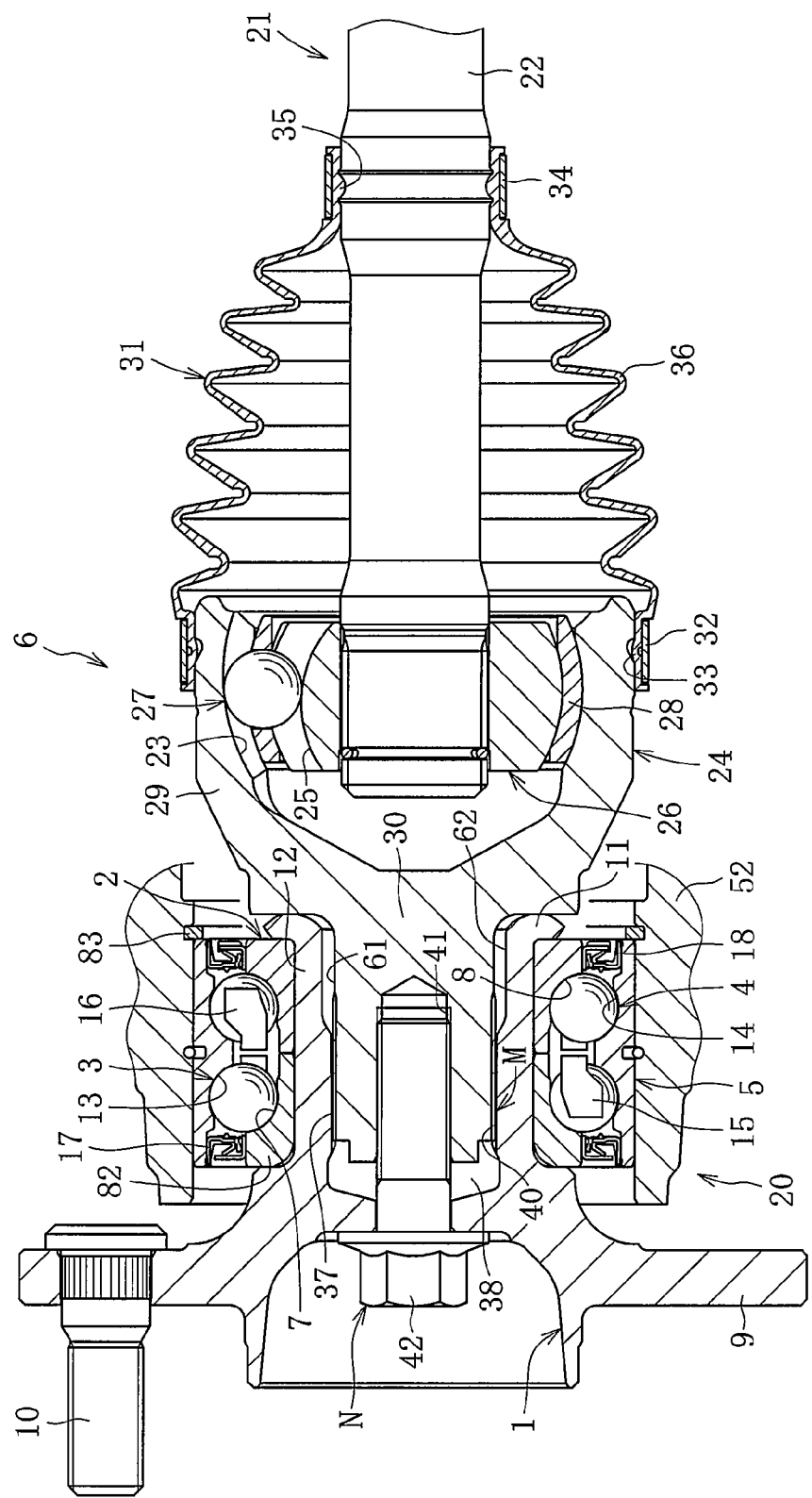
FIG. 19 is a sectional view illustrating a state after assembling the constant velocity universal joint to the wheel bearing of FIG. 18.

FIGS. 18 and 19 illustrate an example of the wheel bearing device of the first generation. FIG. 18 illustrates a state before assembling the constant velocity universal joint 6 to the wheel hearing 20 that is mounted to the knuckle 52. FIG. 19 illustrates a state after assembling the constant velocity universal joint 6 to the wheel bearing 20. The wheel bearing 20 in this embodiment has a structure in which a pair of inner races 82 and 2 is press-fitted to the outer periphery of the hub wheel 1, the inner raceway surface 7 on the outboard side is formed on the outer periphery of one inner race 82, while the inner raceway surface 8 on the inboard side is formed on the outer periphery of the other inner race 2, and the double-row outer raceway surfaces 13 and 14 to be opposed to the inner raceway surfaces 7 and 6 of the inner races 82 and 2 are formed on the inner periphery of the outer race 5. In this wheel bearing 20, the outer race 5 is press-fitted to the knuckle 52 extending from the suspension device of the vehicle body (not shown), and is fixed with a retaining ring 83.

In this embodiment, there is provided a crimping structure in which the end portion of the small-diameter step portion 12 of the hub wheel 1 is crimped outward by orbital forming and thus the inner races 82 and 2 are retained by the crimping portion 11 and integrated with the hub wheel 1, to thereby apply preload to the wheel bearing 20. In this crimping structure, there is exemplified a screw fastening structure in which the bolt 42 is threadedly engaged with the female thread portion 41 of the stem section 30. However, there may be provided a screw fastening structure in which the nut 69 is threadedly engaged with the male thread portion 68 of the stem section 30 (see FIG. 9), and still further, there may be applied a structure in which the PCD of the rolling elements 4 positioned on the inboard side is set larger than the PCD of the rolling elements 3 positioned on the outboard side (see FIG. 12).

Note that, in the embodiment of FIGS. 18 and 19, other components, a procedure of assembling the wheel bearing 20 to the suspension device of the vehicle body, and a procedure of assembling the constant velocity universal joint 6 of the drive shaft 21 to the wheel bearing 20 are similar to those in the embodiment of FIGS. 1 and 2, and hence identical or corresponding parts to those in FIGS. 1 and 2 are represented by the same reference symbols to omit redundant description thereof.

Figure 20:
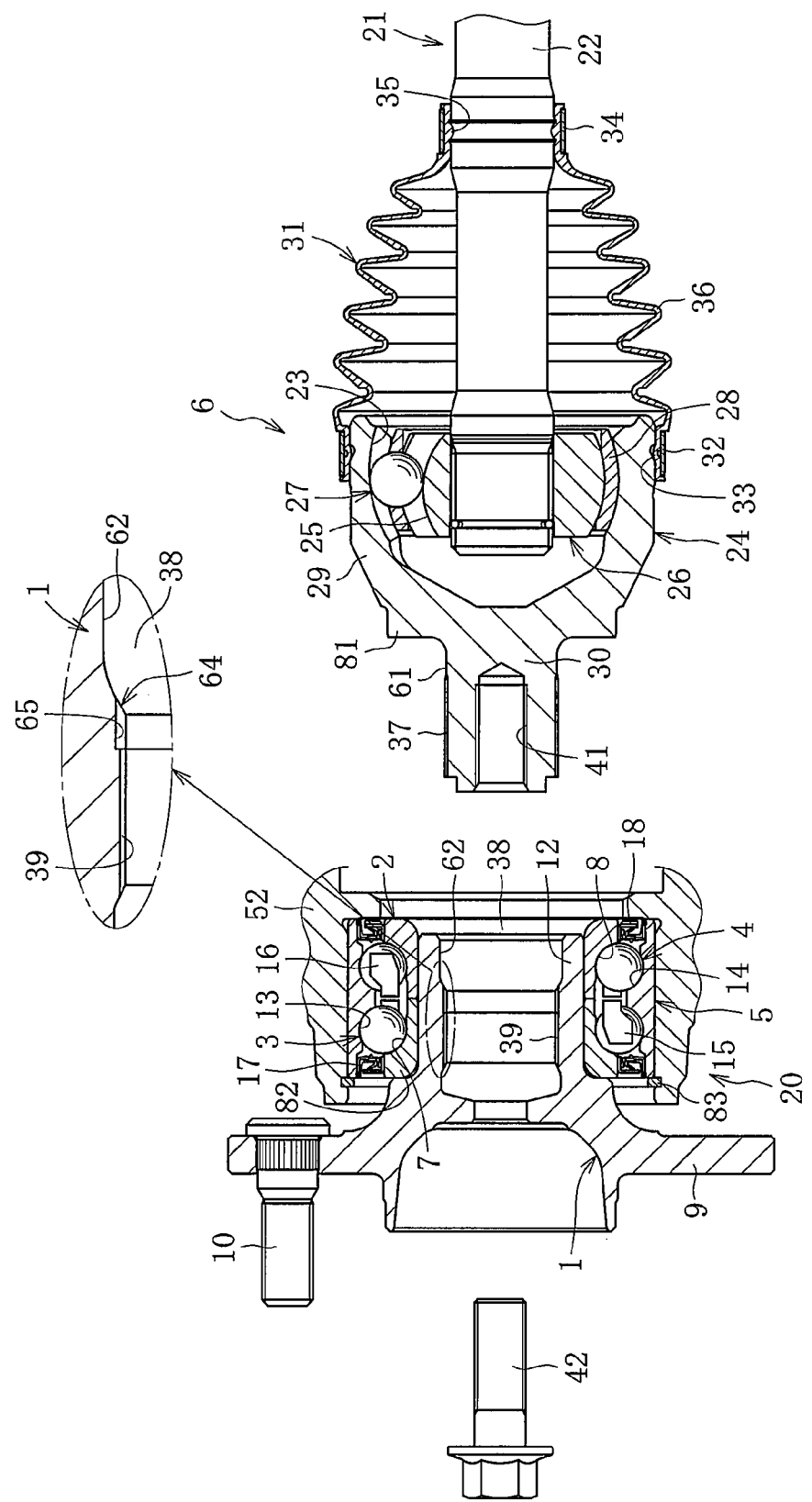
FIG. 20 is a sectional view illustrating a state before assembling a constant velocity universal joint to a wheel bearing having a non-crimping structure that is mounted to a knuckle in a wheel bearing device (first generation) according to another embodiment of the present invention.
Figure 21:
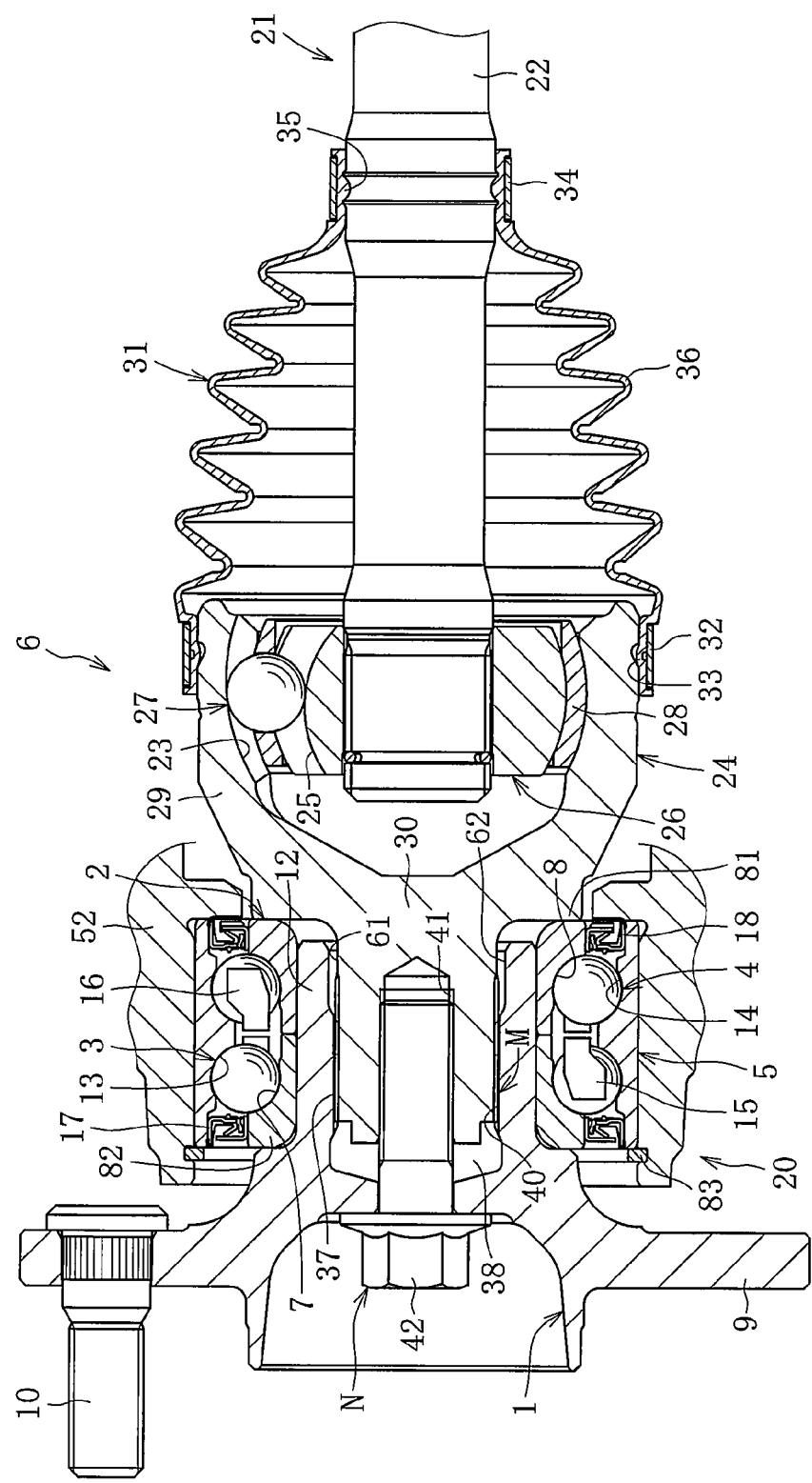
FIG. 21 is a sectional view illustrating a state after assembling the constant velocity universal joint to the wheel bearing of FIG. 20.

Further, in the embodiment illustrated in FIGS. 18 and 19, the crimping structure is exemplified, but a non-crimping structure illustrated in FIGS. 20 and 21 may be employed instead. FIG. 20 illustrates a state before assembling the constant velocity universal joint 6 to the wheel bearing 20 that is mounted to the knuckle 52. FIG. 21 illustrates a state after assembling the constant velocity universal joint 6 to the wheel bearing 20. In the non-crimping structure of this embodiment, the pair of inner races 82 and 2 is press-fitted to the small-diameter step portion 12 of the hub wheel 1, and the end surface of the inner race 2 is brought into abutment against the end surface of the shoulder portion 81 of the outer joint member 24. When this structure is employed, the crimping portion 11 (see FIGS. 1 and 2) is not provided, and hence the light-weighting is achieved. Further, the process involving the orbital forming becomes unnecessary so that the cost is reduced.

In the case of this non-crimping structure, the preload is applied to the wheel bearing 20 due to the axial force generated by fastening the bolt 42. Thus, through use of the bolt 42 subjected to the axial force stabilizing treatment, the fluctuation in axial force with respect to the fastening torque of the bolt 42 can be reduced. In this non-crimping structure, there is exemplified a screw fastening structure in which the bolt 42 is threadedly engaged with the female thread portion 41 of the stem section 30. However, there may be provided a screw fastening structure in which the nut 69 is threadedly engaged with the male thread portion 68 of the stem section 30 (see FIG. 9), and still further, the PCD of the rolling elements 4 positioned on the inboard side may be set larger than the PCD of the rolling elements 3 positioned on the outboard side (see FIG. 12).

Note that, in the embodiment of FIGS. 20 and 21, other components, a procedure of assembling the wheel bearing 20 to the suspension device of the vehicle body, and a procedure of assembling the constant velocity universal joint 6 of the drive shaft 21 to the wheel bearing 20 are similar to those in the embodiment of FIGS. 1 and 2, and hence identical or corresponding parts to those in FIGS. 1 and 2 are represented by the same reference symbols to omit redundant description thereof.

Figure 22:
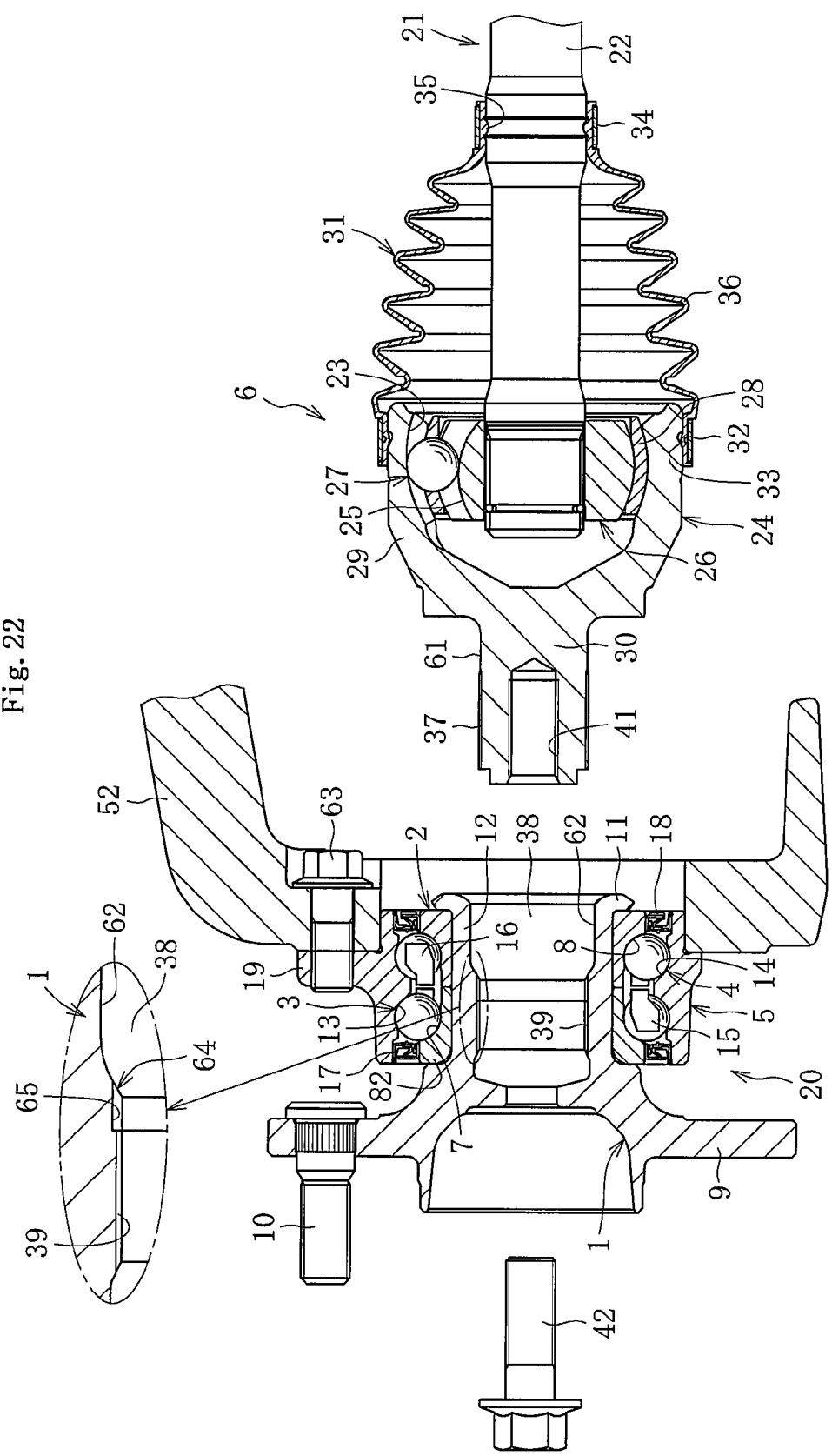
FIG. 22 is a sectional view illustrating a state before assembling a constant velocity universal joint to a wheel bearing having a crimping structure that is mounted to a knuckle in a wheel bearing device (second generation) according to another embodiment of the present invention.
Figure 23:
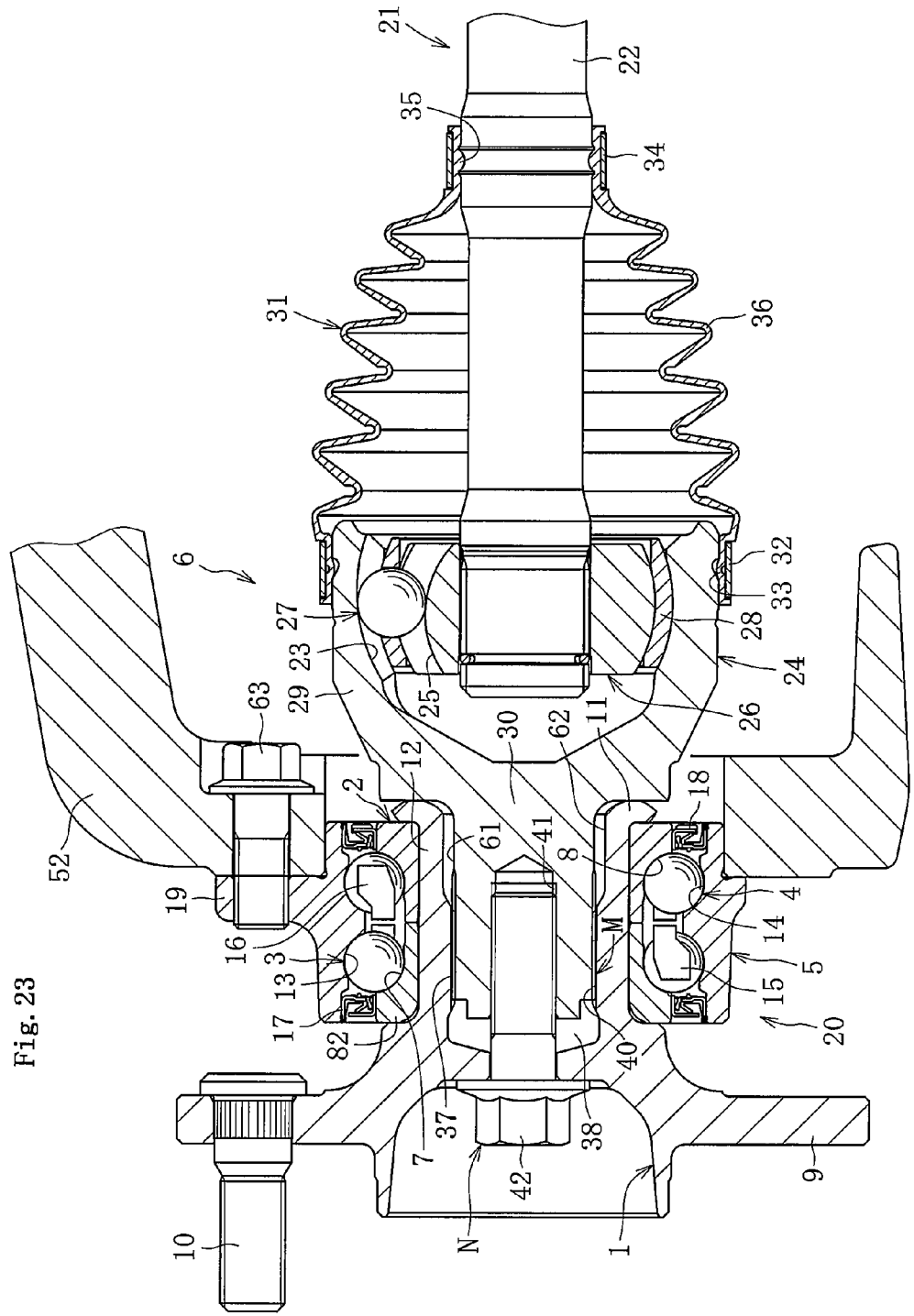
FIG. 23 is a sectional view illustrating a state after assembling the constant velocity universal joint to the wheel bearing of FIG. 22.

FIGS. 22 and 23 illustrate an example of the wheel bearing device of the second generation. FIG. 22 illustrates a state before assembling the constant velocity universal joint 6 to the wheel bearing 20 that is mounted to the knuckle 52. FIG. 23 illustrates a state after assembling the constant velocity universal joint 6 to the wheel bearing 20. The wheel bearing 20 in this embodiment has a structure in which the pair of inner races 82 and 2 is press-fitted to the outer periphery of the hub wheel 1, the inner raceway surface on the outboard side is formed on the outer periphery of one inner race 32, while the inner raceway surface 8 on the inboard side is formed on the outer periphery of the other inner race 2, and the double-row outer raceway surfaces 13 and 14 to be opposed to the inner raceway surfaces 7 and 8 of the inner races 82 and 2 are formed on the inner periphery of the outer race 5. In this wheel bearing 20, the vehicle body mounting flange 19 of the outer race 5 is fixed with the bolt 63 to the knuckle 52 extending from the suspension device of the vehicle body (not shown).

In this embodiment, there is provided a crimping structure in which the end portion of the small-diameter step portion 12 of the hub wheel 1 is crimped outward by orbital forming and thus the inner races 82 and 2 are retained by the crimping portion 11 and integrated with the hub wheel 1, to thereby apply preload to the wheel bearing 20, In this crimping structure, there is exemplified a screw fastening structure in which the bolt 42 is threadedly engaged with the female thread portion 41 of the stem section 30. However, there may be provided a screw fastening structure in which the nut 69 is threadedly engaged with the male thread portion 68 of the stem section 30 (see FIG. 9), and still further, there may be applied a structure in which the PCD of the rolling elements 4 positioned on the inboard side is set larger than the PCD of the rolling elements 3 positioned on the outboard side (see FIG. 12).

Note that, in the embodiment of FIGS. 22 and 23, other components, a procedure of assembling the wheel bearing 20 to the suspension device of the vehicle body, and a procedure of assembling the constant velocity universal joint 6 of the drive shaft 21 to the wheel bearing 20 are similar to those in the embodiment of FIGS. 1 and 2, and hence identical or corresponding parts to those in FIGS. 1 and 2 are represented by the same reference symbols to omit redundant description thereof.

Figure 24:
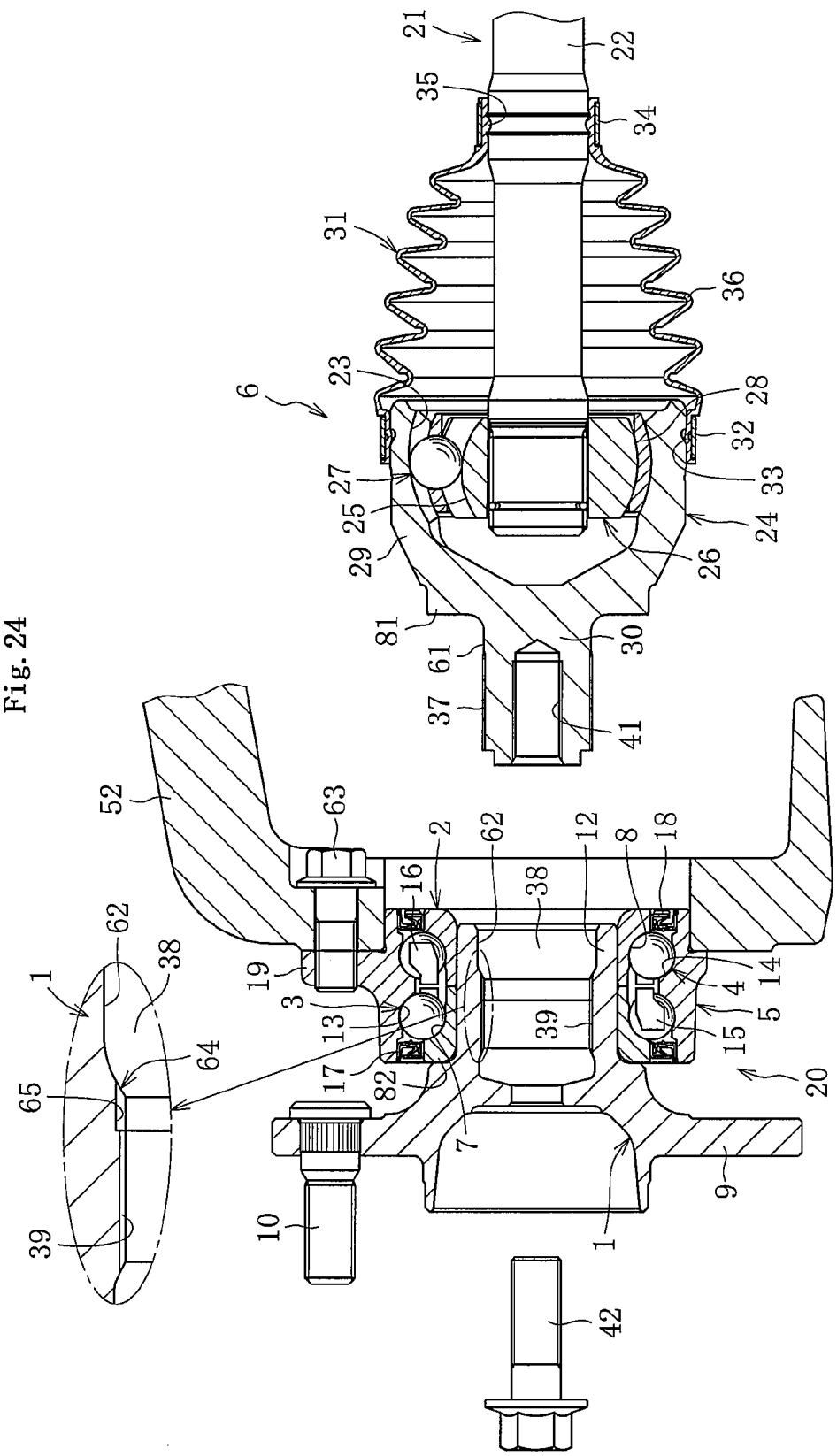
FIG. 24 is a sectional view illustrating a state before assembling a constant velocity universal joint to a wheel bearing having a non-crimping structure that is mounted to a knuckle in a wheel bearing device (second generation) according to another embodiment of the present invention.
Figure 25:
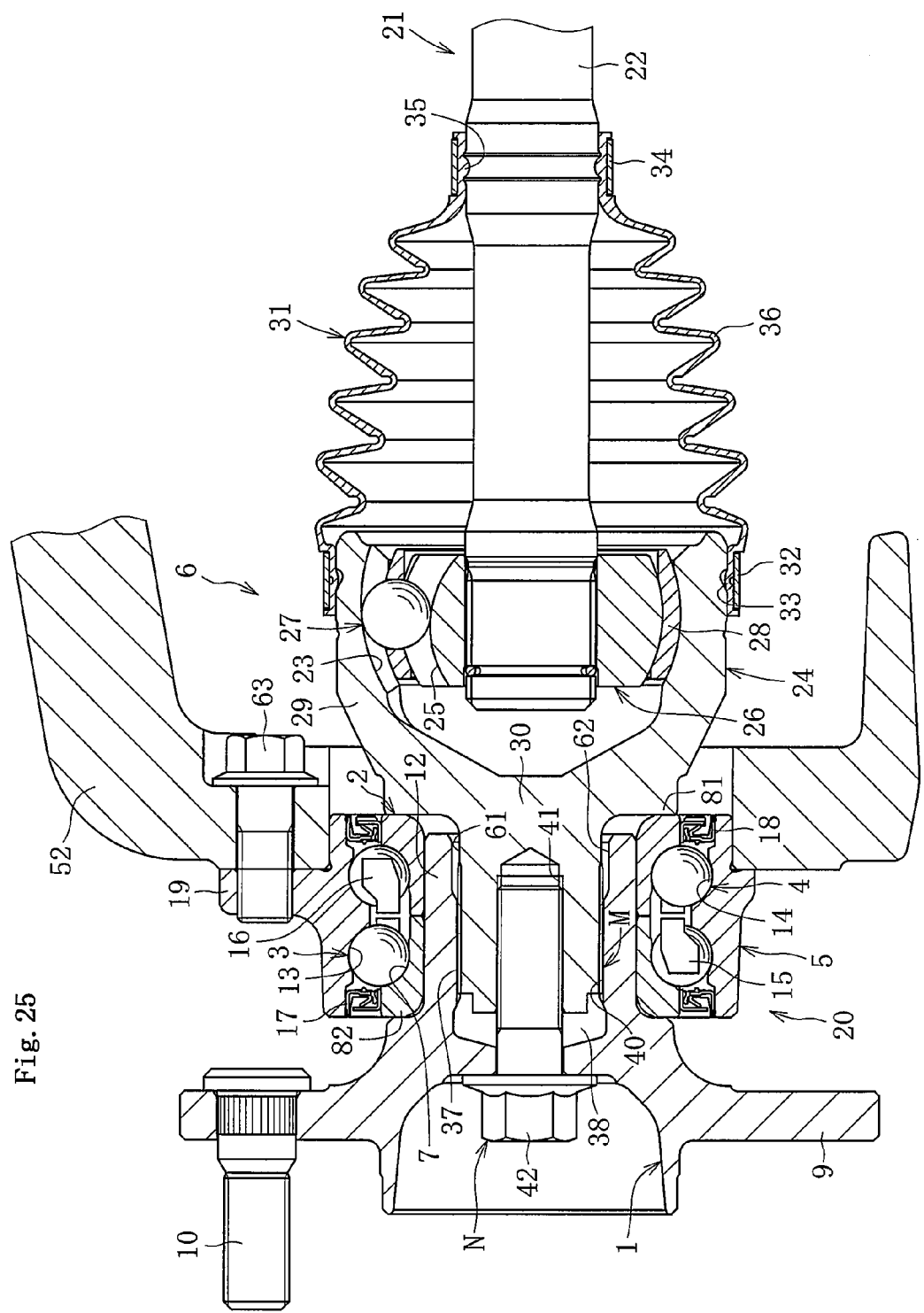
FIG. 25 is a sectional view illustrating a state after assembling the constant velocity universal joint to the wheel bearing of FIG. 24.
Figure 26:
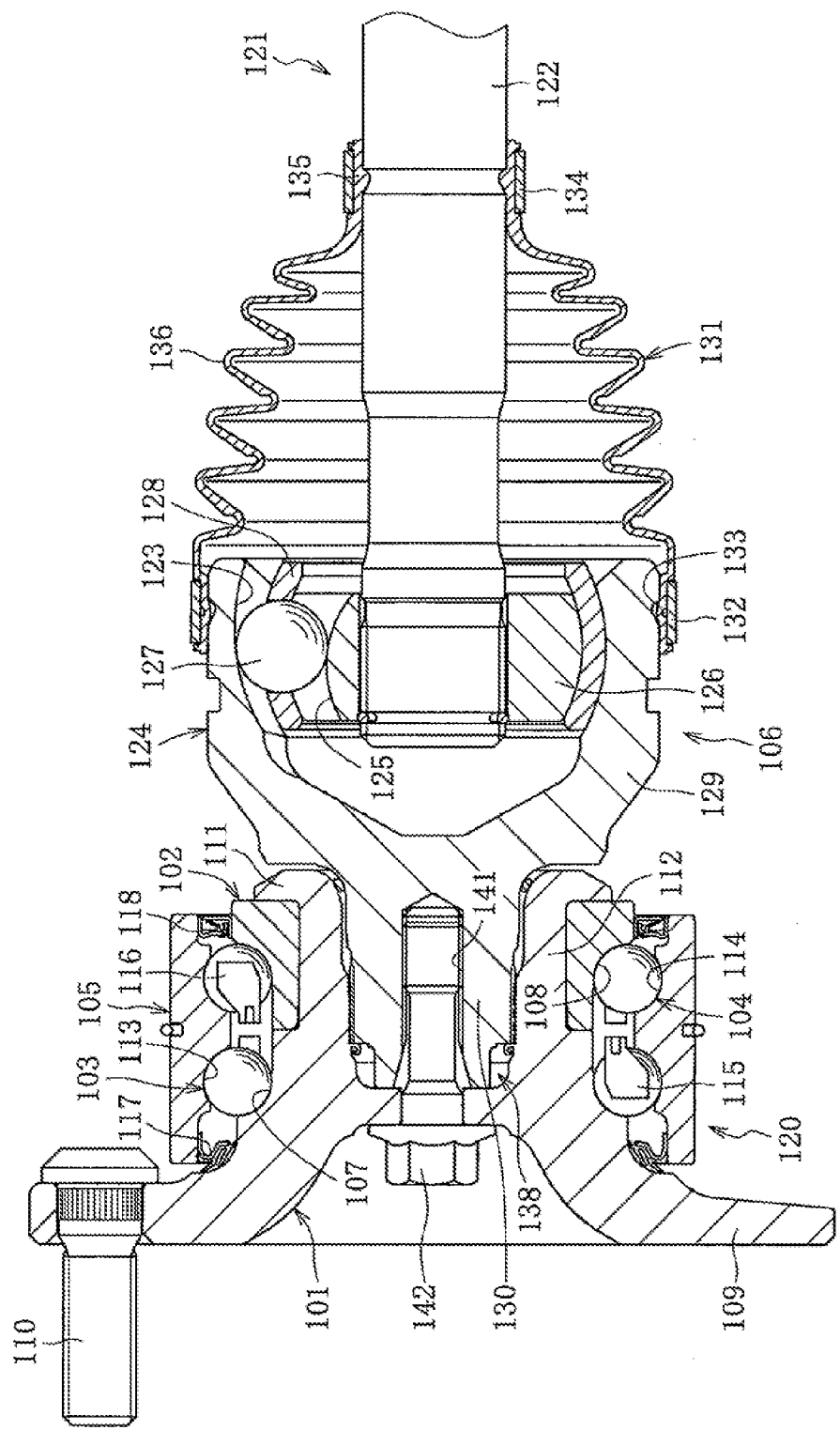
FIG. 26 is a vertical sectional view illustrating an overall structure of a related-art wheel bearing device.

Further, in the embodiment illustrated in FIGS. 22 and 23, the crimping structure is exemplified, but a non-crimping structure illustrated in FIGS. 24 and 25 may be employed instead. FIG. 24 illustrates a state before assembling the constant velocity universal joint 6 to the wheel bearing 20 that is mounted to the knuckle 52. FIG. 25 illustrates a state after assembling the constant velocity universal joint 6 to the wheel bearing 20. In the non-crimping structure of this embodiment, the pair of inner races 82 and 2 is press-fitted to the small-diameter step portion 12 of the hub wheel 1, and the end surface of the inner race 2 is brought into abutment against the end surface of the shoulder portion 81 of the outer joint member 24. When this structure is employed, the crimping portion 11 (see FIGS. 1 and 2) is not provided, and hence the light-weighting is achieved. Further, the process involving the orbital forming becomes unnecessary so that the cost is reduced.

In the case of this non-crimping structure, the preload is applied to the wheel bearing 20 due to the axial force generated by fastening the bolt 42. Thus, through use of the bolt 42 subjected to the axial force stabilizing treatment, the fluctuation in axial force with respect to the fastening torque of the bolt 42 can be reduced. In this non-crimping structure, there is exemplified a screw fastening structure in which the bolt 42 is threadedly engaged with the female thread portion 41 of the stem section 30. However, there may be provided a screw fastening structure in which the nut 69 is threadedly engaged with the male thread portion 68 of the stem section 30 (see FIG. 9), and still further, the PCD of the rolling elements 4 positioned on the inboard side may be set larger than the PCD of the rolling elements 3 positioned on the outboard side (see FIG. 12).

Note that, in the embodiment of FIGS. 24 and 25, other components, a procedure of assembling the wheel bearing 20 to the suspension device of the vehicle body, and a procedure of assembling the constant velocity universal joint 6 of the drive shaft 21 to the wheel bearing 20 are similar to those in the embodiment of FIGS. 1 and 2, and hence identical or corresponding parts to those in FIGS. 1 and 2 are represented by the same reference symbols to omit redundant description thereof.

The present invention is not limited to the embodiments described above, and as a matter of course, may be carried out in various other embodiments without departing from the spirit of the present invention. The scope of the present invention is defined in the scope of claims, and encompasses meaning of equivalents of elements described in the scope of claims and all modifications in the scope of claims.

The invention claimed is:
1. A wheel bearing device comprising a wheel bearing, an outer joint member of a constant velocity universal joint and a screw fastening structure,
the wheel bearing comprising:
an outer member having double-row outer raceway surfaces formed on an inner periphery thereof;
an inner member comprising a hub wheel and an inner race, the inner member having double-row inner raceway surfaces formed on an outer periphery thereof so as to be opposed to the double-row outer raceway surfaces; and double-row rolling elements interposed between the double-row outer raceway surfaces of the outer member and the double-row inner raceway surfaces of the inner member, the outer member of the constant velocity universal joint having a stem section fitted to an inner diameter portion of the hub wheel, the stem section being separably coupled with the hub wheel by the screw fastening structure, wherein a plurality of projecting portions extending in an axial direction are formed on one of the hub wheel and the stem section of the outer joint member, and a plurality of depressed portions are formed on the other of the hub wheel and the stem section of the outer joint member, wherein a shape of the plurality of projecting portions is transferred to the plurality of depressed portions, to thereby provide a projection and depression fitting structure in which the plurality of projecting portions and the plurality of depressed portions are brought into close contact with each other at an entire fitting contact portion therebetween, wherein the plurality of depressed portions are formed by press-fitting the plurality of projecting portions to a plurality of pre-formed depressed portions formed on the other of the hub wheel and the stem section of the outer joint member, the pre-formed depressed portions having interferences with respect to the plurality of projecting portions, wherein the plurality of projecting portions are press-fitted into the plurality of pre-formed depressed portions by an axial force of the screw fastening structure to cut interferences of the pre-formed depressed portions by the projecting portions, and the other of the hub wheel and the stem section of the outer joint member is provided with a flash portion, and wherein the interferences of the plurality of pre-formed depressed portions have a size such that the plurality of projecting portions press-fitted to the plurality of pre-formed depressed portions cut the interferences due to an axial force generated by fastening of the screw fastening structure.

2. The wheel bearing device according to claim 1, wherein the screw fastening structure comprises:
   a female thread portion formed at an axial end of the stem section of the outer joint member; and
   a male thread portion to be locked at the hub wheel in a state of being threadedly engaged with the female thread portion.

3. The wheel bearing device according to claim 1, wherein the screw fastening structure comprises:
   a male thread portion formed at an axial end of the stem section of the outer joint member; and
   a female thread portion to be locked at the hub wheel in a state of being threadedly engaged with the male thread portion.

4. The wheel bearing device according to claim 1,
   wherein the plurality of projecting portions are provided on the stem section of the outer joint member, and
   wherein the plurality of depressed portions are provided on the hub wheel.

5. The wheel bearing device according to claim 1, wherein the plurality of pre-formed depressed portions having the interferences with respect to the plurality of projecting portions are set smaller than the plurality of projecting portions.

6. The wheel bearing device according to claim 1, wherein a surface hardness of the plurality of projecting portions is set larger than a surface hardness of the plurality of depressed portions.

7. The wheel bearing device according to claim 1, wherein the projection and depression fitting structure comprises an accommodating portion for accommodating a flash portion generated due to transfer of the shape of the plurality of projecting portions through press fitting.

8. The wheel bearing device according to claim 1, wherein the projection and depression fitting structure further comprises a guide portion for guiding a start of the press fitting.

9. The wheel bearing device according to claim 1,
   wherein, among the double-row rolling elements, a PCD of a rolling elements positioned on an inboard side is set larger than a PCD of a rolling elements positioned on an outboard side, and
   wherein the projection and depression fitting structure is arranged on the inboard side with respect to a bearing center.

10. The wheel bearing device according to claim 1, wherein the hub wheel has a cutout hole for confirming a press-fitting position of the plurality of projecting portions.

11. A wheel bearing comprising:
    an outer member having double-row outer raceway surfaces formed on an inner periphery thereof;
    an inner member comprising a hub wheel and an inner race, the inner member having double-row inner raceway surfaces formed on an outer periphery thereof so as to be opposed to the double-row outer raceway surfaces; and
    double-row rolling elements interposed between the double-row outer raceway surfaces of the outer member and the double-row inner raceway surfaces of the inner member,
    wherein the hub wheel has a portion to be fitted with a stem section of an outer member of a constant velocity universal joint and is separably coupled to the stem section by a screw fastening structure,
    wherein the hub wheel has a plurality of pre-formed depressed portions having interferences with respect to a plurality of projecting portions, the projecting portions extending in an axial direction and being formed on the stem section of the outer joint member, wherein the plurality of projecting portions are press-fitted into the plurality of pre-formed depressed portions by an axial force of the screw fastening structure to cut interferences of the pre-formed depressed portions by the plurality of projecting portions, and the hub wheel is provided with a flash portion,
    and wherein the interferences of the plurality of pre-formed depressed portions have a size such that the plurality of projecting portions press-fitted to the plurality of pre-formed depressed portions cut the interferences due to an axial force generated by fastening of the screw fastening structure.

12. A wheel bearing according to claim 11, wherein the hub wheel comprises:
    a pre-formed depressed portion provided on an outboard side of an inner peripheral surface of the hub wheel; and
    a guide portion provided on an inboard side of the depressed portion, and
    wherein the guide portion comprises a recessed portion that is larger than the pre-formed depressed portion provided on the outboard side.

13. The wheel bearing according to claim 12, further comprising a cylindrical fitting surface formed on the inboard side of the guide portion.

14. The wheel bearing according to claim 11, wherein, among the double-row rolling elements, a PCD of the rolling elements positioned on the inboard side is set larger than a PCD of the rolling elements positioned on the outboard side.

15. The wheel bearing according to claim 11, wherein the pre-formed depressed portions are arranged on an inner periphery of the hub wheel that is positioned at a groove bottom of an inner raceway surface of a rolling elements positioned on the inboard side.

16. A manufacturing method of a wheel bearing device comprising a wheel bearing, an outer joint member of a constant velocity universal joint and a screw fastening structure, the wheel bearing comprising:

an outer member having double-row outer raceway surfaces formed on an inner periphery thereof;

an inner member comprising a hub wheel and an inner race, the inner member having double-row inner raceway surfaces formed on an outer periphery thereof so as to be opposed to the double-row outer raceway surfaces; and double-row rolling elements interposed between the double-row outer raceway surfaces of the outer member and the double-row inner raceway surfaces of the inner member, the outer member of the constant velocity universal joint having a stem section fitted to an inner diameter portion of the hub wheel, the stem section being separably coupled with the hub wheel by the screw fastening structure, the method comprising:

forming a plurality of projecting portions extending in an axial direction on one of the hub wheel and the stem section of the outer joint member;

forming a plurality of pre-formed depressed portions having interferences with respect to the plurality of projecting portions on the other of the hub wheel and the stem section of the outer joint member;

press-fitting the plurality of projecting portions to the plurality of pre-formed depressed portions due to an axial force generated by fastening of the screw fastening structure; and forming a plurality of depressed portions by cutting due to interferences of the plurality of the pre-formed depressed portions by the press-fitting of the plurality of projecting portions, the other of the hub wheel and the stem section of the outer joint member being provided with a flash portion.

* * * * *